(12) United States Patent
Weder et al.

(10) Patent No.: US 11,946,522 B2
(45) Date of Patent: Apr. 2, 2024

(54) FRICTIONAL DAMPER

(71) Applicant: SUSPA GmbH, Altdorf (DE)

(72) Inventors: Michael Weder, Nuremberg (DE); Andreas Pelczer, Altdorf (DE)

(73) Assignee: SUSPA GMBH, Altdorf (DE)

( * ) Notice: Subject to any disclaimer, the term of this patent is extended or adjusted under 35 U.S.C. 154(b) by 273 days.

(21) Appl. No.: 17/182,869

(22) Filed: Feb. 23, 2021

(65) Prior Publication Data

US 2021/0262543 A1 Aug. 26, 2021

(30) Foreign Application Priority Data

Feb. 24, 2020 (DE) ..................... 10 2020 202 348.4

(51) Int. Cl.
*F16F 7/08* (2006.01)

(52) U.S. Cl.
CPC .......... *F16F 7/085* (2013.01); *F16F 2222/04* (2013.01); *F16F 2224/025* (2013.01); *F16F 2228/066* (2013.01); *F16F 2230/0005* (2013.01); *F16F 2230/0041* (2013.01); *F16F 2230/18* (2013.01); *F16F 2232/08* (2013.01)

(58) Field of Classification Search
CPC .. F16F 7/085; F16F 2222/04; F16F 2224/025; F16F 2228/066; F16F 2230/0005; F16F 2230/0041; F16F 2230/18; F16F 2232/08
USPC .................................................. 188/381, 67
See application file for complete search history.

(56) References Cited

U.S. PATENT DOCUMENTS

| | | | |
|---|---|---|---|
| 2,934,175 A | 4/1960 | Schnitzer | |
| 9,022,185 B2 | 5/2015 | Kanioz | |
| 10,436,273 B2* | 10/2019 | Weder | F16F 7/09 |
| 2006/0011429 A1 | 1/2006 | Park et al. | |
| 2008/0256986 A1* | 10/2008 | Ackermann | D06F 37/20 |
| | | | 68/23.1 |
| 2015/0354653 A1 | 12/2015 | Kanıöz | |
| 2017/0321776 A1* | 11/2017 | Bauer | F16F 7/09 |

FOREIGN PATENT DOCUMENTS

| | | |
|---|---|---|
| DE | 10358204 A1 | 7/2005 |
| DE | 102016220809 A1 | 4/2018 |
| EP | 0009045 B1 * | 3/1982 |
| EP | 0009045 B1 | 3/1982 |
| EP | 3193038 A1 | 7/2017 |
| EP | 3296587 A1 | 3/2018 |
| JP | 62113931 A * | 5/1987 |
| WO | 2005065484 A1 | 7/2005 |
| WO | 2020008422 A1 | 1/2020 |

\* cited by examiner

*Primary Examiner* — Xuan Lan Nguyen
(74) *Attorney, Agent, or Firm* — McGlew and Tuttle, P.C.

(57) ABSTRACT

A frictional damper includes a housing having a longitudinal axis, a tappet which is movable along the longitudinal axis, a frictional unit for generating a direction-dependent frictional force on the tappet, wherein the frictional unit includes at least one friction lining lying rubbingly against the tappet, and a switching unit for variably setting the frictional force.

25 Claims, 16 Drawing Sheets

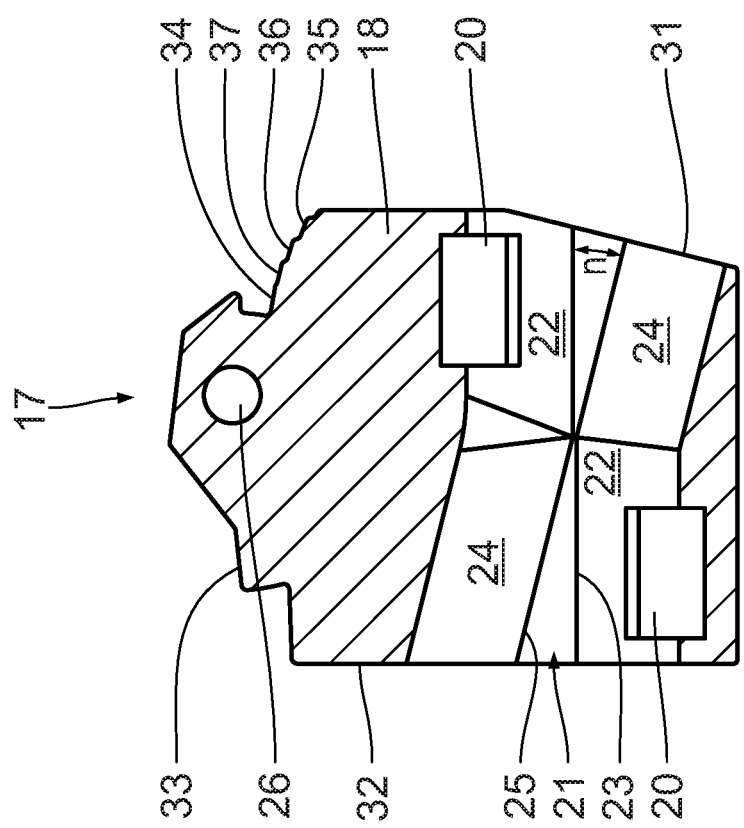
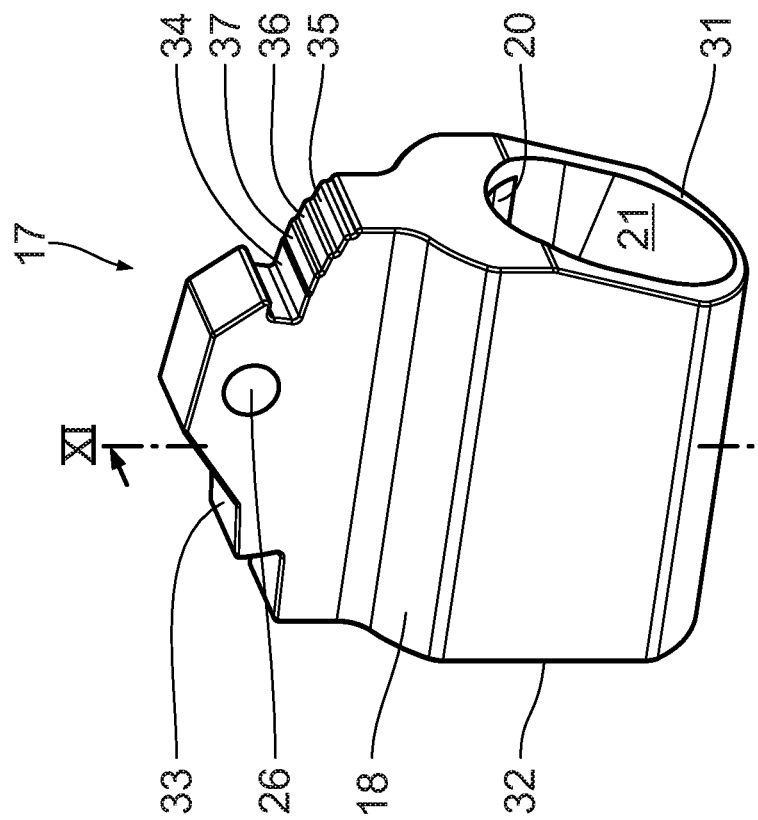
Fig. 11
Fig. 10

FRICTIONAL DAMPER

CROSS-REFERENCES TO RELATED APPLICATIONS

This application claims the priority of German Patent Application, Serial No. 10 2020 202 348.4, filed Feb. 24, 2020, the content of which is incorporated herein by reference in its entirety as if fully set forth herein.

FIELD OF THE INVENTION

The invention relates to a frictional damper.

BACKGROUND OF THE INVENTION

A direction-dependent frictional damper is known from EP 3 296 587 A1. Depending on the actuating direction of a tappet, either a pulled-out friction or a pushed-in friction which is different therefrom is in effect.

SUMMARY OF THE INVENTION

It is an object of the present invention to provide a frictional damper with extended functionality.

This object is achieved according to the invention by a frictional damper comprising a housing having a longitudinal axis, a tappet which is movable along the longitudinal axis, a frictional unit for generating a direction-dependent frictional force on the tappet, wherein the frictional unit comprises at least one friction lining lying rubbingly against the tappet, and a switching unit for variably setting the frictional force.

It has been found, according to the invention, that an extended functionality is made possible for a frictional damper which has a switching unit. The switching unit serves for variably setting a frictional force. The frictional force is generated in a direction-dependent manner by a frictional unit. The frictional force acts on a tappet which is movable along a longitudinal axis of a housing of the functional damper. The frictional force generated by the frictional unit is direction-dependent, in particular dependent on the direction of movement of the tappet, i.e. along a pulling-out direction of the tappet out of the housing or along a pushing-in direction of the tappet into the housing. Direction-dependent means that the frictional force in the pushing-in direction differs in terms of magnitude from the frictional force in the pulling-out direction. In particular, the frictional force which acts in the pulling-out direction and which is also referred to as the pulled-out friction is greater than the frictional force which acts in the pushing-in direction and is also referred to as the pushed-in friction. In order to generate the frictional force, the frictional unit has at least one friction lining which lies rubbingly against the tappet.

The frictional force can be variably set by means of the switching unit. In particular, the magnitude of the frictional force can be variably set, in particular in a stepwise manner. In particular, the magnitude of the frictional force can be set in a direction-dependent and/or direction-independent manner. In particular, the magnitude of the frictional force is set in the pulling-out direction and can be set variably in particular in the pushing-in direction, in particular in a manner increasing along the pushing-in direction. This means that, when the tappet is actuated in the pushing-in direction, the frictional force is greater the further the tappet is pushed into the housing. The magnitude of the frictional force is in particular amplitude-dependent. The magnitude of the frictional force is in particular direction-dependent. In order to variably set the frictional force, the switching unit interacts with the frictional unit. If the frictional force is set by means of the switching unit for an extreme position of a friction lining carrier of the frictional unit, the frictional force is in particular not direction-dependent, but rather direction-independent. This means that the frictional force is direction-independent in the extreme positions of the friction lining carrier when said frictional force is set by the switching unit. In this case, the frictional force is identical in magnitude in the pushing-in direction and in the pulling-out direction. The extreme positions are in particular a minimal position and a maximal position of the friction lining carrier. In the minimal position of the friction lining carrier, in particular a minimal pushing-in force is exerted on the tappet in the pushing-in direction. In the maximal position, in particular a maximal frictional force is exerted on the tappet in the pushing-in direction. Between the extreme positions, the friction lining carrier can also take up at least one intermediate position. The friction lining carrier can also take up a plurality of different intermediate positions, in particular at least two intermediate positions, in particular at least three intermediate positions, in particular at least four intermediate positions, in particular at least five intermediate positions, in particular at least ten intermediate positions, in particular at least 15 intermediate positions and in particular at most 20 intermediate positions. It is in particular possible to set the friction lining carrier in the at least one intermediate position by means of the switching unit in such a manner that an actuation of the tappet in the pushing-in direction causes movement of the friction lining carrier and therefore the frictional force in the pushing-in direction changes, whereas an actuation of the tappet in the pulling-out direction does not cause any movement of the friction lining carrier, and therefore a constant frictional force is in effect in the pulling-out direction.

An embodiment of the frictional unit, in which the frictional unit comprises a friction lining carrier on which the at least one friction lining is held, wherein the friction lining carrier is arranged such that it is movable relative to the tappet between a pulled-out position and a pushed-in position, permits a direct and uncomplicated generation of the direction-dependent frictional force. The frictional unit has in particular a plurality of friction linings, in particular precisely two, in particular more than two, in particular at least three, in particular at least four, and in particular at most twenty friction linings. The frictional unit acts passively. By means of a friction lining carrier which is arranged in particular in the housing, the pulled-out friction or the pushed-in friction can be generated by said friction lining carrier being moved between a pulled-out position and a pushed-in position. By changing the friction lining carrier between the pulled-out position and the pushed-in position, the arrangement of the at least one friction lining relative to the tappet is also changed. This changes in particular the magnitude of the frictional force depending on the direction of movement of the tappet, The switching unit serves in particular for the switchable locking of the friction lining carrier, in particular in the pulled-out position and/or in the pushed-in position. The movability of the friction lining carrier is blocked by the locking. In the extreme positions of the friction lining carrier, the arrangement of the at least one friction lining relative to the tappet is set independently of the direction of movement of the tappet. In the blocked arrangement of the friction lining carrier, pulled-out friction and pushed-in friction are identical in magnitude.

In particular, the frictional unit interacts with the tappet in such a manner that, when the tappet moves in the pulling-out direction, the friction lining carrier is moved into the pulled-out position and, when the tappet moves in the pushing-in direction, it is moved into the pushed-in position. The movement of the frictional unit arises directly from the movement of the tappet, in particular by means of the frictional force between the at least one friction lining and the tappet. The movement of the frictional unit is integrated in the typical actuating sequence of the frictional damper.

Tilting of the friction lining carrier, in which the friction lining carrier is arranged in the housing such that it is tiltable about a tilting axis, wherein the tilting axis is arranged transversely with respect to the longitudinal axis, simplifies the change between the pulled-out position and the pushed-in position. The tilting axis is arranged in particular fixedly on the housing. The tilting axis is oriented transversely with the longitudinal axis of the housing. In particular, the tilting axis is oriented substantially perpendicularly to the longitudinal axis 3, wherein angular deviations of +/−15° regarding a perpendicular orientation with respect to the longitudinal axis are conceivable for the tilting axis. In particular, the angular orientation between the tilting axis and the longitudinal axis is between 75° and 105°, in particular between 80° and 100°, in particular between 85° and 95°, in particular between 87° and 93°, in particular between 88° and 92°, in particular between 89° and 91°, and in particular exactly 90°. In particular, a tilting pin, to which the friction lining carrier is coupled in a tiltable manner with a tilting opening, is arranged in the housing. The tilting pin predetermines the tilting axis. The tilting capability of the friction lining carrier is simplified. The friction lining carrier is also referred to as a tilting piston.

In particular, the tilting axis is arranged spaced apart from the longitudinal axis, in particular in an inclined manner with respect to the longitudinal axis. Owing to the spaced-apart arrangement of the tilting axis with respect to the longitudinal axis, tilting of the friction lining carrier, i.e. switching over between the pulled-out position and the pushed-in position, is advantageously possible. In particular, a torque with respect to the tilting axis is brought about directly on the friction lining carrier depending on the actuation of the tappet in the pushing-in direction or in the pulling-out direction.

An embodiment of the friction lining carrier, in which the friction lining carrier has at least one friction lining receptacle in which the at least one friction lining is arranged, ensures an uncomplicated and reliable arrangement of the at least one friction lining in a friction lining receptacle provided therefor. In particular, at least one and in particular precisely one friction lining receptacle is provided for each friction lining. In particular, a plurality of friction lining receptacles, in particular two, are integrated in the friction lining carrier, wherein a friction lining is arranged in each friction lining receptacle.

An embodiment of the frictional damper comprising two friction linings which in particular each have a half-shell contour permits an improved, in particular more efficient, generation of frictional force. It is conceivable to configure the friction linings to be identical. The outlay on production for the frictional damper is reduced. The friction linings have in particular a contour which corresponds to the outer contour of the tappet. The friction linings can lie flat, in particular over the full surface, against the tappet. The generation of frictional force is efficient. The friction linings have in particular a half-shell contour. The half-shell contour is an open tubular cross section. The inner contour of the half-shell is in particular an inner cylindrical circumferential surface. It is also conceivable for the tappet to have a cross-sectional area which is oriented perpendicularly with respect to the longitudinal axis and is non-circular, in particular oval or polygonal. The inner contour of the friction lining is configured in a corresponding manner in this case. It is also conceivable for the friction lining to be formed by one or more friction strips. A friction strip is substantially flat. The friction strip is in particular flexible, and therefore the friction strip, in particular by being placed in the friction lining receptacle, assumes the contour corresponding to the tappet. In particular, the friction lining receptacle has a contour corresponding to the tappet.

An embodiment of the friction lining carrier, in which the friction lining carrier has a through opening, through which the tappet is guided, permits effective frictional damping. The at least one friction lining can be arranged in the radial direction with respect to the longitudinal axis between the tappet, which is arranged on the inside, and the friction lining carrier, which is arranged on the outside. In particular, the at least one friction lining is pressed in the radial direction onto the tappet by the friction lining carrier. The friction lining carrier with a through opening permits a compact construction of the frictional unit.

An embodiment of the through opening, in which the through opening has a contour which is asymmetrical at least in sections perpendicularly with respect to the longitudinal axis, permits an advantageous switchover between the pulled-out position and the pushed-in position. In particular, collision-free tilting of the friction lining carrier in relation to the tappet between the pulled-out position and the pushed-in position is possible. A through opening of the friction lining carrier provides the clearance which is required for switching over between the pulled-out position and the pushed-in position. There is an asymmetrical contour of the through opening, for example, by virtue of the fact that the contour has a dividing line. The through opening has in particular an asymmetrical inner contour. The asymmetrical inner contour can be of symmetrical configuration in sections and can be configured, for example, as a circular segment. Symmetrically means rotationally symmetrical with respect to the longitudinal axis. The asymmetrical inner contour at any rate has at least one asymmetrical section which is in particular non-circular. A plurality of asymmetrical sections which are in particular formed separately from one another can also be provided. It is essential that the asymmetrical inner contour at least in sections is not rotationally symmetrical with respect to the longitudinal axis. Asymmetrical means in particular not rotationally symmetrical with respect to the longitudinal axis which is oriented perpendicularly with respect to the contour. The dividing line is in particular a straight line which intersects in particular the longitudinal axis. The dividing line symbolises a dividing plane which extends along the longitudinal axis. The dividing line can also be curved or kinked. The dividing line divides the contour of the through opening into a symmetrical, in particular circular, contour section and an asymmetrical, in particular non-circular, contour section. The symmetrical contour section and the asymmetrical contour section are separated from one another by means of the dividing line.

An embodiment of the through opening, in which the through opening has a first through opening section and a second through opening section, wherein, in particular, the first through opening section and the second through opening section each have a section longitudinal axis, said section longitudinal axes being arranged inclined by an angle of inclination with respect to one another, ensures that the friction lining carrier is arranged either with a first or with a second through opening section parallel to the longitudinal axis of the housing depending on the tilting position. The through opening sections each have a section longitudinal axis, said section longitudinal axes being arranged inclined with respect to one another. The section longitudinal axes are oriented in particular in such a manner that, in the pulled-out position of the friction lining carrier, a first section longitudinal axis is arranged parallel to the longitudinal axis of the housing and a second section longitudinal axis is arranged inclined with respect to the longitudinal axis of the housing. In a corresponding manner, in the pushed-in position, the second section longitudinal axis is arranged parallel to the longitudinal axis of the housing, and the first section longitudinal axis is arranged inclined with respect to the longitudinal axis of the housing.

A friction lining receptacle being configured as a depression in the through opening permits reliable and secure receiving of the friction lining on the friction lining carrier. The friction lining is held in the friction lining receptacle in particular in the radical direction and/or in the axial direction with respect to the longitudinal axis of the housing and/or the section longitudinal axis. The friction lining receptacle has in particular a depth which is slightly smaller than the thickness of the friction lining, with the result that that the friction lining is pressed onto the tappet permanently in the radial direction. The friction lining receptacle has a length which is oriented along the longitudinal axis and corresponds approximately to the length of the friction lining. The friction lining is then held in the friction lining receptacle reliably and in a manner not prestressed axially. It is also conceivable to prestress the friction lining in the axial direction by the friction lining receptacle having a length which is smaller than the length of the friction lining.

In an embodiment of the through opening with a cross section which is oriented perpendicular with respect to the longitudinal axis and is variable along the longitudinal axis, it is ensured that the friction lining reliably lies at least in sections against the tappet depending on the tilting position of the friction lining carrier.

Fastening elements on the frictional damper, in which the frictional damper has a first fastening element, which is arranged in particular on the housing, and a second fastening element, which is arranged in particular on the tappet, for the fastening to parts which are movable with respect to one another, permit direct fastening of the frictional damper to parts which are movable with respect to one another, in particular a washtub and a housing of a washing machine.

An embodiment of the switching unit, in which the switching unit has a switchable actuator and a locking element which is coupled mechanically to the actuator, permits a robust and direct locking of the friction lining carrier. In particular, a locking element serves for direct interaction with the friction lining carrier.

The switching unit has a switchable actuator which is in particular a linear actuator and can be configured in particular as a solenoid, spindle motor, pneumatic cylinder or hydraulic cylinder. It is essential that the actuator can be double-acting and in particular self-holding. This means that the actuator is movable in both linear directions in an actively switched manner, i.e. driven along said directions, and in particular can hold the respective position. Alternatively, the actuator can be configured as a single-acting actuator, i.e. actively switched only in one of the two linear directions. An embodiment of the locking element, in which the locking element has at least one contact surface with which the locking element lies against at least one locking surface of the friction lining carrier in the locked arrangement, ensures efficient setting of the frictional force. The locking element lies in particular directly against the friction lining carrier. The locking element is movable in particular into a spaced-apart arrangement with respect to the friction lining carrier. In said spaced-apart arrangement, the movability of the friction lining carrier is unobstructed. If the locking element is arranged without contact by the friction lining carrier, the friction lining carrier is unlocked. In this arrangement of the locking element, the frictional unit generates the friction-dependent frictional force. For the locked arrangement, the locking element has a contact surface with which the locking element lies against a locking surface of the friction lining carrier.

An embodiment of the locking element, in which the locking element is in the form of a sliding element which is movable linearly, in particular perpendicularly with respect to the tilting axis, is uncomplicated and stable. In particular, the actuation of the locking element and/or the interaction of the locking element with the friction lining carrier is uncomplicated and mechanically robust.

A recess of the locking element, in which the locking element has a recess for collision-free moving of the locking element along the longitudinal axis, simplifies the locking of the friction lining carrier. The friction lining carrier can be arranged in and/or at the recess of the locking element. The locking element is movable along the longitudinal axis in a manner free from collision with respect to the friction lining carrier. A frictional damper of this type permits a compact and robust, in particular space-saving construction. The recess is in particular in the form of an opening, in particular a through opening. The recess and in particular the through opening have an area which is oriented in particular parallel to the longitudinal axis and parallel to the tilting axis. The recess, in particular the through opening, extends at the locking element, in particular starting from a lower side facing the friction lining carrier, along a direction of extent which is oriented perpendicularly to the area. The direction of extent is oriented in particular perpendicularly with respect to the longitudinal axis and perpendicularly with respect to the tilting axis. It is also conceivable for the recess not to extend completely continuously through the locking element. The recess can also extend from a side surface of the locking element, in particular along the tilting axis. It is in particular conceivable for recesses to be provided on both sides of the locking element such that the friction lining carrier engages around the locking element in the manner of a clip and is guided past the locking element.

A failsafe unit for a failsafe function of the frictional damper for arranging the locking element in a locked arrangement on the friction lining carrier in such a manner that a maximal direction-independent frictional force is in effect ensures reliable and in particular damage-free and/or destruction-free operation of the frictional damper in the event of an unintended disturbance. Such a disturbance is present in particular if the switchable actuator is unintentionally deactivated. An unintentional deactivation is provided, for example, for an actuator in the form of a solenoid, if the energisation unintentionally stops, for example in the event of a current failure. Switching of the actuator is then no longer possible. The failsafe unit ensures that, in this case, the locking element is moved into a position in which the frictional damper has a maximum frictional effect. This position is referred to as the maximal position.

The failsafe unit has in particular at least one force storage element, in particular two or more force storage elements, which is configured in particular as a mechanical spring, in particular as a helical compression spring. The actuator is a single-acting solenoid. By means of energisation, the solenoid is switched and moved into a position such that the locking element locks the friction lining carrier in a minimal position with a minimal direction-independent frictional force. The single-acting actuator can also be activated so as to lock one or more intermediate positions of the friction lining carrier, in which there is a greater frictional force than the minimal frictional force. One or more intermediate positions can be realised, for example, by the actuator being activated with a voltage proportional to the spring force such that the friction lining carrier is held in the at least one intermediate position. By application of the voltage proportional to the spring force, the magnet is activated and holds the friction lining carrier in the intermediate position. The actuator is actuated for the targeted variable setting of the frictional force. If the actuator is deactivated, i.e. the current supply is ended, the friction lining carrier is moved into the maximal position as a result of the spring force. In this case, the maximal frictional force is in effect. If the actuator is actuated with an increased voltage, the friction lining carrier is moved counter to the spring force into another intermediate position or into the minimal position which depends on the voltage with which the actuator is activated. A frictional force which is reduced in relation to the maximal frictional force and in particular is minimal is effective in said intermediate position or minimal position. Targeted setting of a reduced, in particular minimal, frictional force is thereby possible.

The locking element is moved into the minimal position counter to the spring force of the at least one force storage element. A counterforce is thereby impressed in the force storage element, said counterforce counteracting the movement and arrangement of the locking element in the minimal position.

Owing to the impressed counterforce of the force storage element, the locking element is moved out of the minimal position or an intermediate position, in particular into the maximal position. In particular, the counterforce exerted by the force storage element is dimensioned in such a manner that it reliably moves the locking element and the actuator back into the maximal position. In particular, the at least one force storage element ensures reliable movement of the locking element with the actuator into the maximal position in the event of an unintentional current failure. The failsafe unit ensures what is referred to as a failsafe mode of the frictional damper. In the event of current failure, the frictional damper is prevented from being unintentionally actuated with a reduced and in particular with a minimal frictional force. Damage to and/or destruction of the components to be damped is prevented.

The actuator can have proportional or complete self-holding. The energy consumption is reduced by the proportional or complete self-holding since the energisation of the actuator can be reduced or deactivated when the actuator together with the locking element is in the minimal position or an intermediate position. In the event of partial self-holding, the at least one force storage element brings about the movement back into the maximal position if the energisation intentionally or unintentionally ceases. In the event of complete self-holding, an additional electrical energy store serves for providing electrical energy for triggering the switching operation into the maximal position. The electrical energy store can be formed by one or more capacitors. The electrical energy store provides a current pulse for a switching operation, which serves for releasing the self-holding of the actuator. As soon as the actuator leaves the self-holding position, i.e. the minimal position, the self-holding force thereof is also significantly reduced. The further movement of the actuator back into the maximal position takes place on the basis of the counterforce impressed in the force storage element, i.e. in the mechanical spring. In order, in the event of the complete self-holding, to ensure the failsafe function, a control device is provided which, in the event of a current failure, can provide the required current pulse for the switching operation.

The control device has in particular at least one or more electrical components, in particular electromechanical components, in particular electromechanical switches, in particular relays, and/or electronic components, in particular electronic switching components, in particular transistors. If mains voltage is present, the additional electrical energy store is electrically charged. The connection of the electrical energy store to the actuator is disconnected by means of the electrical component. In the event of an, in particular unintentional, current failure, the electrical components ensure that the electrical energy store is disconnected from the charging device, in particular the mains network, and connected to the actuator. For this purpose, the electrical switching components are configured in particular in such a manner that, in the voltage-free state, they connect the electrical energy store to the actuator.

Additionally or alternatively, it is also possible to use the electrical energy stored in the electrical energy store additionally for controlling the control device, in particular by means of transistors.

The features specified in the patent claims and the features specified in the following exemplary embodiments of the frictional damper according to the invention are in each case suitable, individually or in combination with one another, for further developing the subject matter according to the invention. The respective combinations of features do not constitute any limitation in respect of further developments of the subject matter of the invention, but rather have substantially merely an exemplary character.

Further features, advantages and details of the invention emerge from the following description of two exemplary embodiments with reference to the drawing.

BRIEF DESCRIPTION OF THE DRAWING

FIG. 10 shows an enlarged perspective illustration of the friction lining carrier, FIG. 11 shows a sectional illustration according to sectional line XI-XI in FIG. 10.

DESCRIPTION OF THE PREFERRED EMBODIMENTS

Figure 1:
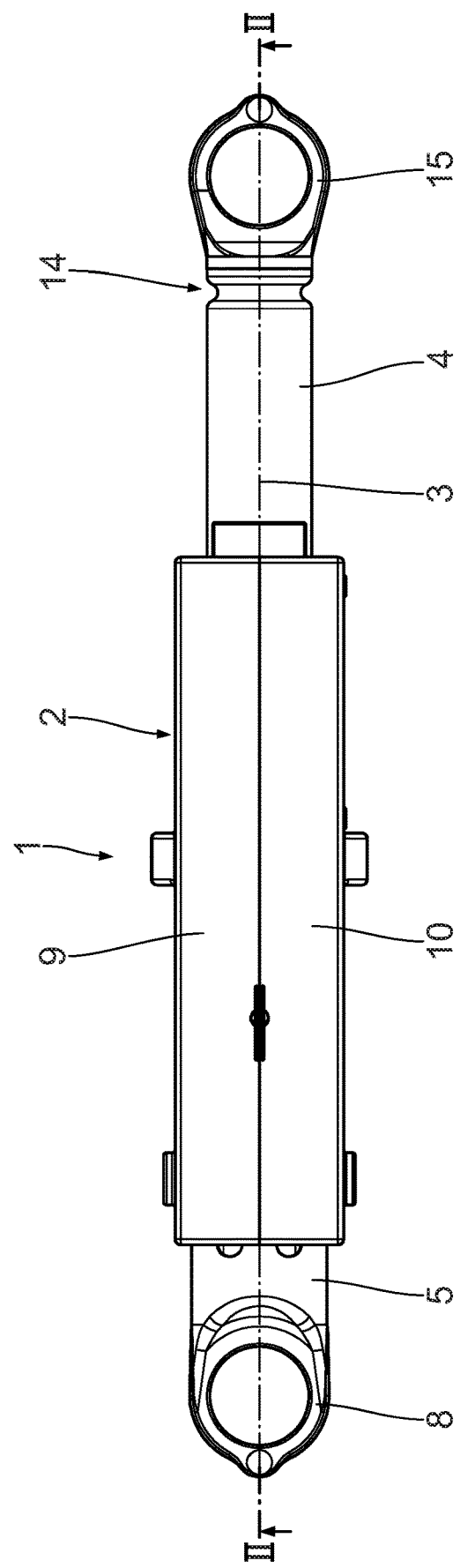
FIG. 1 shows a side view of a frictional damper according to the invention.

A frictional damper which is denoted in FIGS. 1 to 13 as a whole by 1 has a housing 2 with a longitudinal axis 3 and a tappet 4 which is movable along the longitudinal axis 3.

The housing 2 is of multiple-piece configuration and comprises a tubular housing section 5 and a damping housing section 6 which is connected to the latter. The tubular housing section 5 and the damping housing section 6 are arranged one behind the other along the longitudinal axis 3. The tubular housing section 5 and the damping housing section 6 which is connected thereto together form the housing 2.

The tubular housing section 5 has, at least in sections, a tubular section, the inner contour of which corresponds to the outer contour of the tappet 4. The tubular section of the tubular housing section 5 serves for axially guiding the tappet 4. According to the exemplary embodiment which is shown, the tubular section is configured as a cylinder tube. In a manner corresponding to the outer contour of the tappet 4, the inner contour of the tubular section can also be non-circular, in particular oval or polygonal, in particular square, hexagonal or octagonal. The tubular housing section 5 is oriented concentrically with respect to the longitudinal axis 3. The tubular housing section 5 has an annular collar 7 which is oriented protruding radially outward with respect to the longitudinal axis 3. The annular collar 7 is connected in particular integrally to the tubular section, in particular is moulded integrally thereon. The annular collar 7 is configured in particular on the end side of the tubular housing section 5. The tubular housing section 5 is arranged in sections within the damping housing section 6, i.e. is surrounded in sections by the damping housing section 6. At an exposed end opposite the annular collar 7, the tubular housing section 5 has a first fastening element 8 in the form of a fastening lug.

Figure 9:
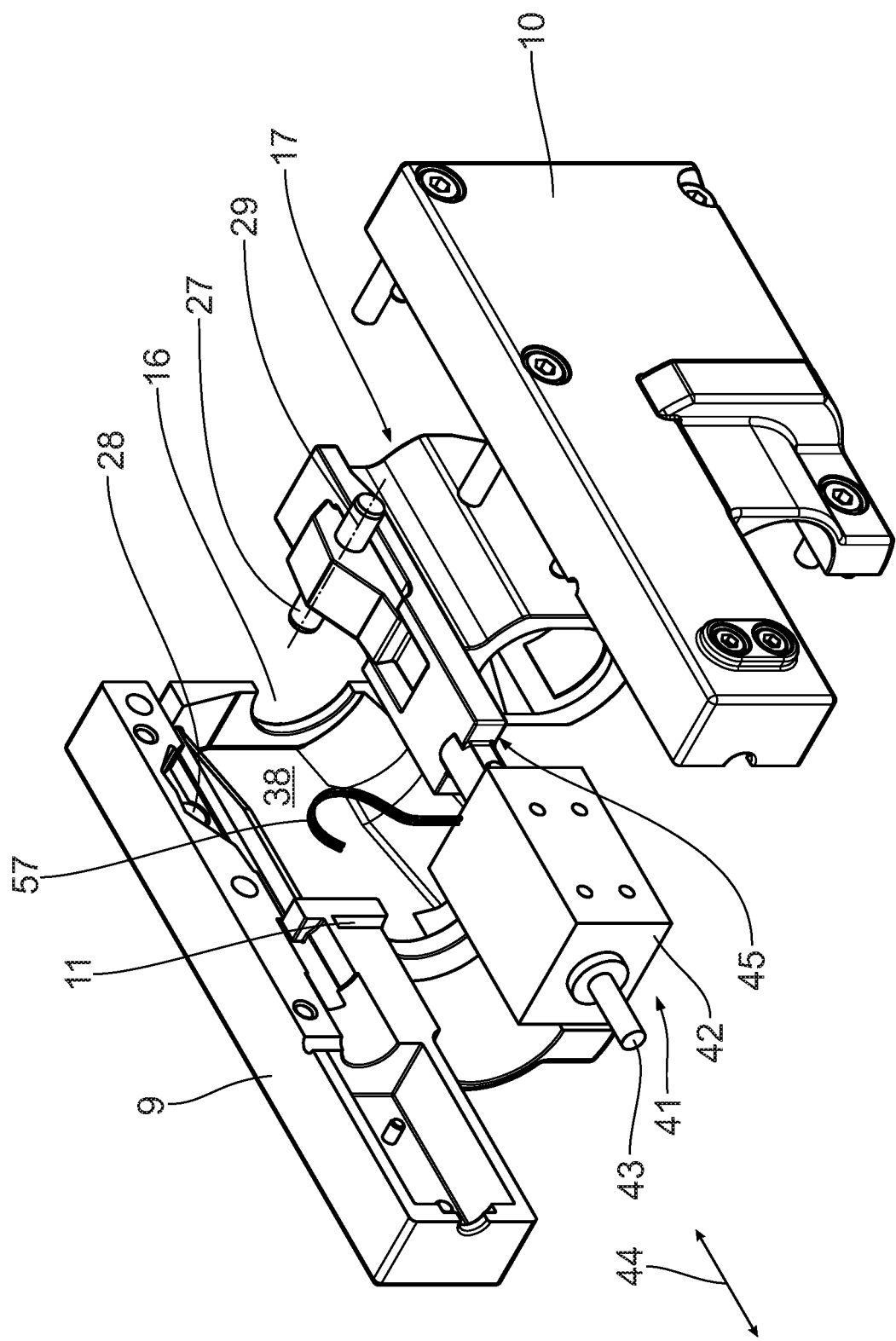
FIG. 9 shows a perspective exploded illustration of frictional unit and switching unit.

The damping housing section 6 is of multiple-piece configuration and comprises two housing half-shells 9, 10 which are illustrated in particular in FIG. 9. The housing half-shells 9, 10 are connectable to each other releasably with respect to a dividing plane. The dividing plane is oriented perpendicularly with respect to the plane of the drawing according to FIG. 1 and contains the longitudinal axis 3. The housing half-shells 9, 10 each have a recesses 11 which correspond to the tubular housing section 5, in particular to the tubular section and the annular collar 7, and into which the tubular housing section 5 is inserted. The tubular housing section 5 is connected to the damping housing section 6 in a form-fitting manner. The tubular housing section 5 is fixed axially and radially on the damping housing section 6 with respect to the longitudinal axis 3.

The tappet 4 is of tubular configuration. The tappet 4 is a sliding tube. According to the exemplary embodiment which is shown, the tappet 4 is configured as a cylinder tube. It is conceivable for the tappet 4 to be configured a tube with a differing outer contour, in particular with a non-circular outer contour, such as, for example, an oval or polygonal, in particular square, hexagonal or octagonal, outer contour. It is essential that the outer contour of the tappet 4 is constant along the longitudinal axis 3. The tappet 4 is arranged at its first end 12, which has an insertion slope 13, in the housing 2, in particular in the tubular housing section 5.

At a second end 14 opposite the first end 12, the tappet 4 has a second fastening element 15 which is configured as a fastening lug. The second fastening element 15 is plugged in particular with a connecting section into the end side of the sliding tube of the tappet 4 and fastened therein. According to the exemplary embodiment which is shown, the sliding tube of the tappet 4 is connected on the fastening section of the second fastening element 15 by compression moulding. Other joining methods, such as adhesive bonding and welding, are also possible.

The second end 14 of the tappet 4 with the second fastening element 15 is arranged outside the housing 2.

The frictional damper 1 can be coupled with the fastening elements 8, 15 to parts which are movable with respect to one another and are to be damped. For example, for damping oscillations of a washing machine, the fastening elements 8, 15 are connected to the housing of the washing machine and to the washtub of the washing machine.

The housing 2 has a housing opening 16 through which the tappet 4 is guided into the housing 2, in particular through the damping housing section 6 into the tubular housing section 5.

The frictional damper 1 has a frictional unit 17 which is illustrated in detail in FIGS. 10 and 11. The frictional unit 17 comprises a friction lining carrier 18 on which two identical friction linings 19 each in the shape of a half-shell are held. The friction linings 19 are each arranged in a friction lining receptacle 20 which is configured as a depression in an inner surface of a through opening 21 of the friction lining carrier 18.

The friction lining carrier 18 is configured in the manner of a piston.

In the mounted state of the frictional damper 1, the tappet 4 is guided through the through opening 21.

The through opening 21 is asymmetrical at least in sections in a plane perpendicular with respect to the longitudinal axis. The through opening 21 has a first through opening section 22 with a first section longitudinal axis 23 and a second through opening section 24 with a second section longitudinal axis 25.

In particular, the friction lining recesses 20 are each arranged as groove-shaped depressions in the region of the first through opening sections 22. The first through opening sections 22 extend along 180° in the circumferential direction with respect to the longitudinal axis 3. In each case a first through opening section 22 and a second through opening section 24 together form the closed through opening 21. Since the first section longitudinal axis 23 is arranged inclined by an angle of inclination n in relation to the second section longitudinal axis 25, the contour of the inner surface of the through opening 21, which contour is formed by the partial contours of the first through opening section 22 and the second through opening section 24, is non-circular. According to the exemplary embodiment which is shown, the angle of inclination is approximately 15°. In particular: 0°<n<45°, in particular 5°<n<30°, in particular 10°<n<20°.

A first through opening section 21 and a second through opening section 24 are in each case arranged one behind the other along the longitudinal axis 3.

The friction lining carrier 18 has a pivoting opening 26 through which a connecting element 27 in the form of a tilting pin is guided for pivotably arranging the friction lining carrier 18 in the housing 2. The connecting element 27 is held in each case on the end side in a corresponding receptacle 28 on an inner side of the housing half-shells 9, 10. The connecting element 27 predetermines a tilting axis 29 about which the friction lining carrier 18 is tiltable on the connecting element 27 and therefore in relation to the housing 2. The tilting axis 29 is oriented perpendicularly with respect to the longitudinal axis 3 of the housing 2. The tilting axis 29 is oriented in a manner spaced apart from the longitudinal axis 3. The tilting axis 29 and the longitudinal axis 3 do not intersect. The positional relationship of the tilting axis 29 and the longitudinal axis 3 in space is referred to as inclined. The tilting axis 29 is oriented in particular perpendicularly with respect to the dividing plane of the housing half-shells 9, 10. The pivoting opening 26 is arranged on the friction lining carrier 18 in a manner spaced apart from the through opening 21.

The friction lining carrier 18 comprises a first stop surface 31 and a second stop surface 32. The first stop surface 31 and the second stop surface 32 are arranged opposite each other along the longitudinal axis 3 with respect to the pivoting opening 26. The first stop surface 31 and the second stop surface 32 are in each case arranged on an outer side of the friction lining carrier 18.

The friction lining carrier 18 has a first locking surface 33 and a second locking surface 34. Furthermore, the friction lining carrier 18 has a third locking surface 35, a fourth locking surface 36 and a fifth locking surface 37. The locking surfaces 34, 35, 36 and 37 are of step-like configuration and are adjacent to one another on an outer side of the friction lining carrier 18. The locking surfaces 34, 35, 36 and 37 in each case directly adjoin one another.

For the tiltable arrangement of the friction lining carrier 18 in the housing 2, the housing half-shells 9, 10 each have a friction lining carrier recess 38 which substantially corresponds to the outer contour of the friction lining carrier 18, but permits the friction lining carrier 18 to be tiltable in the housing 2 about the tilting axis 29. The friction lining carrier recess 38 has mating surfaces 39 and 40 corresponding to the stop surfaces 31 and 32.

The frictional damper 1 furthermore has a switching unit 41. The switching unit 41 comprises a switchable actuator 42 which is configured as a linear actuator. For the actuation of the electrically switchable actuator 42, the latter has a connection cable 57. The actuator 42 has an actuating element 43 which can be shifted along an actuating direction 44. The actuating direction 44 is oriented parallel to the longitudinal axis 3. The actuator 42 can be configured, for example, as a solenoid, a spindle motor, a pneumatic cylinder or a hydraulic cylinder. The actuator 42 is configured to be double-acting, i.e. can be actively removed along the pushing-in direction 58 and along the pulling-out direction 58. The actuator 42 is configured to be self-holding. The actuator 42 reliably held in the respectively activated position.

The switching unit 41 has a locking element 45 which is mechanically coupled to the actuator 42, in particular to the actuating element 43. The actuator 42 serves for moving the locking element 45 linearly along the actuating direction 44.

Figure 12:
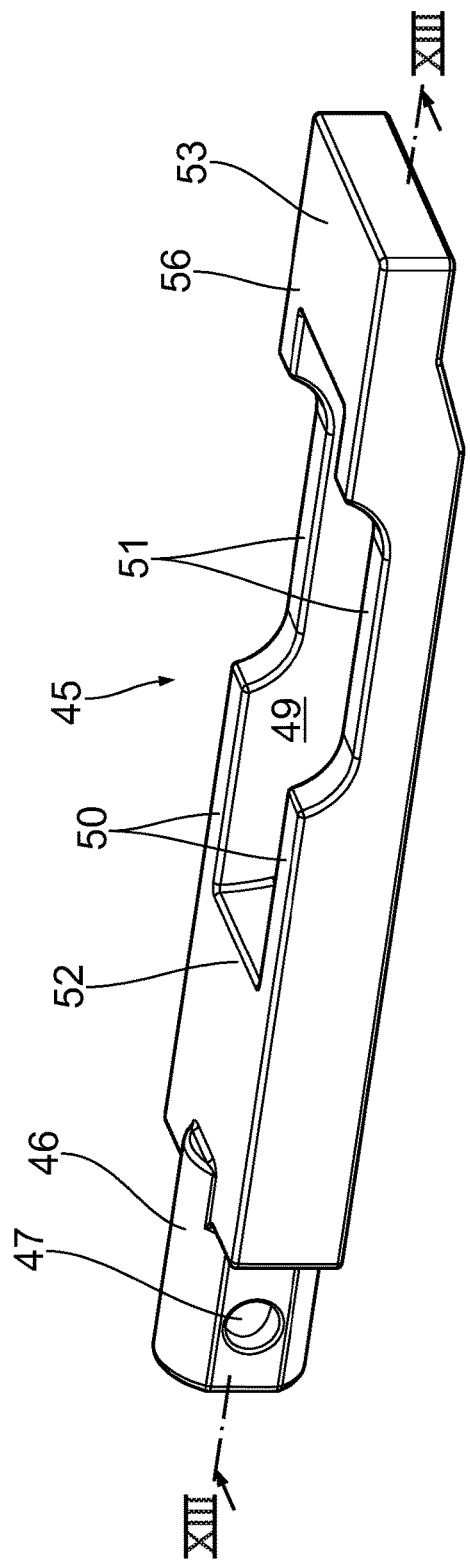
FIG. 12 shows an enlarged perspective illustration of the locking element.
Figure 13:
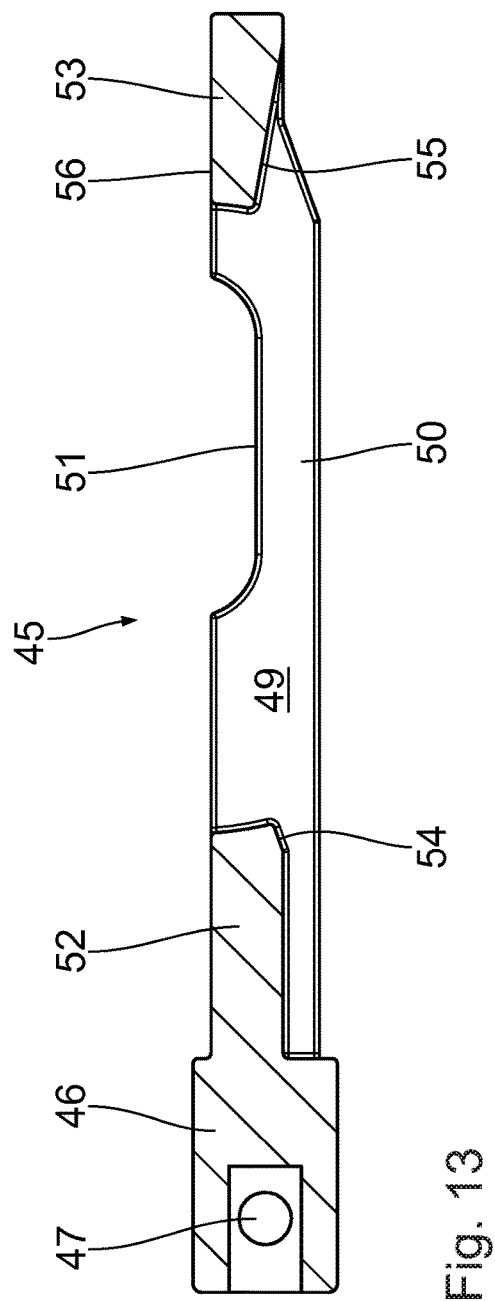
FIG. 13 shows a sectional illustration according to sectional line XIII-XIII in FIG. 12.
Figure 14:
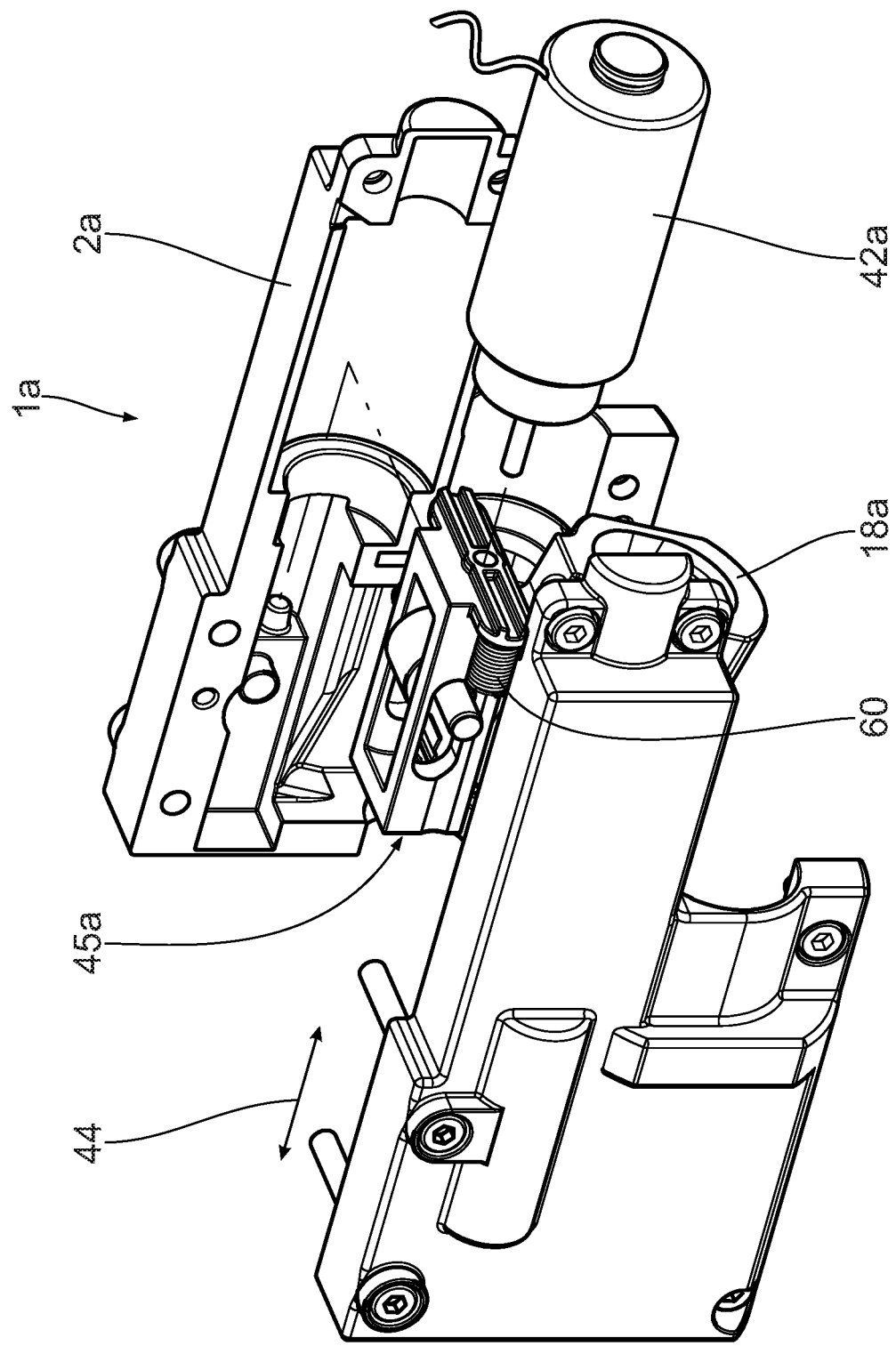
FIG. 14 shows an illustration corresponding to FIG. 9 of frictional unit and switching unit of a frictional damper according to a second exemplary embodiment.

The locking element 45 which is illustrated in detail in FIGS. 12 and 13 has a pin-shaped connecting section 46 which serves for connection to the actuating element 43. For this purpose, the connecting section 46 is provided with a transverse bore 47 through which a connecting bolt 48 for connection to the actuating element 43 is guided.

The locking element 45 is configured as a slider. The locking element 45 is substantially configured in the manner of a strip, wherein the strip extends along the actuating direction 44. The locking element has a recess 49 which is configured as an opening and through which the friction lining carrier 18 is guided in the mounted arrangement of the frictional damper 1. Owing to the opening 49, the locking element 45 is configured in the manner of a frame.

The locking element 45 has side webs 50 which bound the opening 49 and are oriented parallel to the actuating direction 44, and in each case a groove-shaped depression 51 in which the connecting element 27 is arranged.

The locking element 45 has a rear transverse web 52 facing the connecting section 46 and a front transverse web 53 facing away from the connecting section 46. The transverse webs 52, 53 bound the opening 49 in the direction of the actuating direction 44. The transverse webs 52, 53 in each case connect the oppositely arranged side webs 50.

A first contact surface 54 is formed on the rear transverse web 52, on the lower side thereof and adjacent to the opening 49.

The front transverse web 53 has a substantially wedge-shaped contour which tapers toward the rear transverse web 52. The front transverse web 53 has a second contact surface 55. The second contact surface 55 forms the lower side which is inclined in relation to the upper side 56 of the front transverse web 53.

The functioning of the frictional damper 1 will be explained in more detail below with reference to in particular FIGS. 2 to 8. According to FIG. 2, the switching unit 41 in the frictional damper 1 is switched in such a manner that the movability of the friction lining carrier 18 is unblocked. The friction lining carrier 18 can tilt about the tilting axis 29 depending on the direction of movement of the tappet 4. In particular, the locking element 45 is arranged in such a manner that the friction lining carrier 18 is tiltable in the housing 2 without contact with respect to the locking element 45. In the mentioned switching position of the switching unit 41, the friction lining carrier 18 is released.

Figure 2:
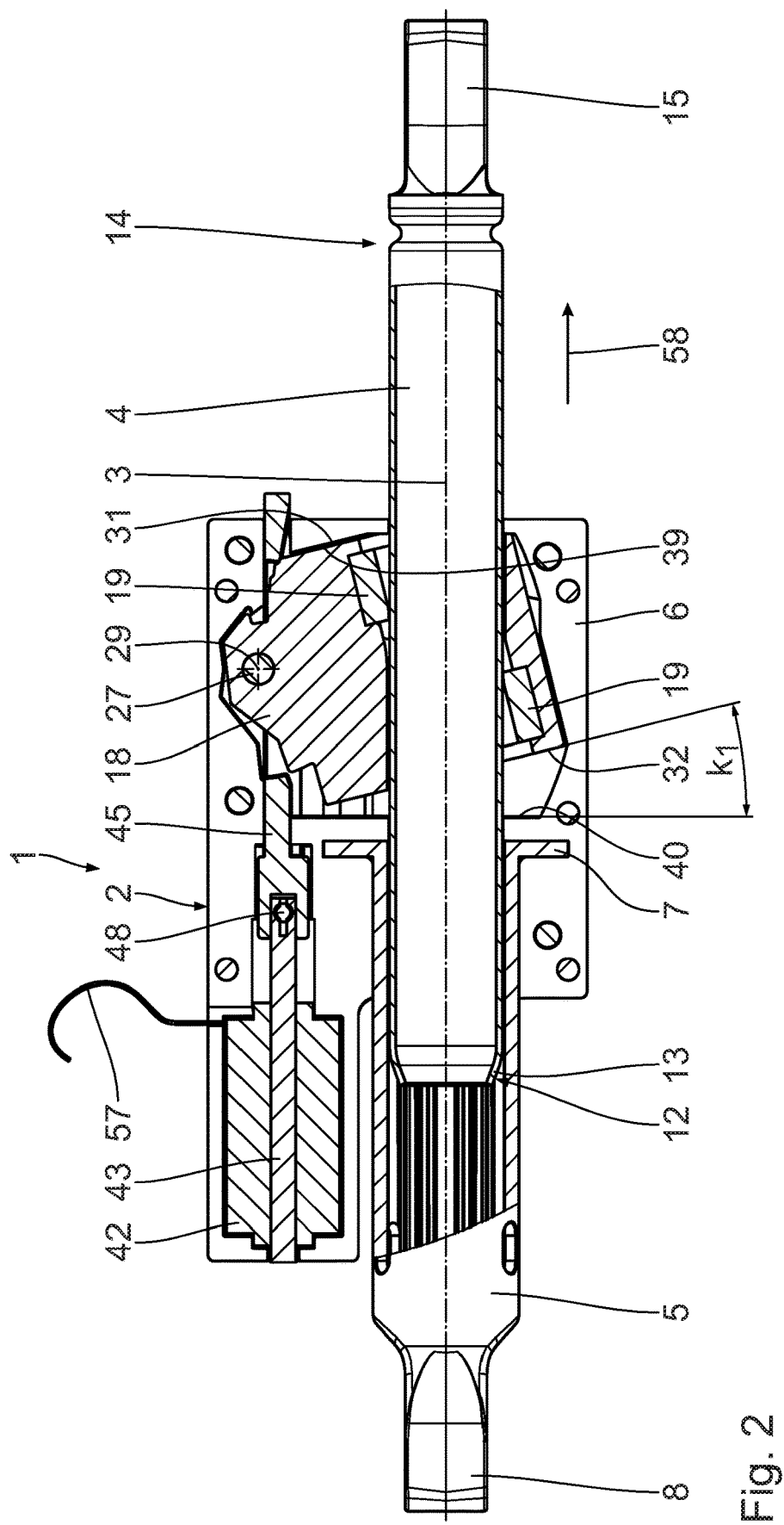
FIG. 2 shows a partially sectioned illustration according to sectional line II-II in FIG. 1 with an unlocked friction lining carrier in the event of an actuation in the pulling-out direction.

During movement of the tappet 4, as illustrated in FIG. 2, along a pulling-out direction 58, the outer contour of the tappet 4 rubs against the friction linings 19. As a result of the frictional force transmission from the tappet 4 to the friction linings 19 and the friction lining carrier 18, a torque acts on the friction lining carrier 18, said torque, according to FIG. 2, being oriented counter clockwise with respect to the tilting axis 29. Starting from the arrangement in FIG. 2, further tilting of the friction lining carrier 18 is prevented since the friction lining carrier 18 lies with the first stop surface 31 against the corresponding first mating surface 39 of the housing 2.

In the arrangement shown in FIG. 2, the friction lining carrier 18 is in a pulled-out position. In the pulled-out position, the friction lining carrier 18 is tilted by a first tilting angle $k_1$ about the tilting axis 29.

Owing to the fact that the contact surface and the surface pressure of the friction linings 19 with the tappet 4 is minimal, the frictional effect, what is referred to as the pulled-out friction, caused in the pulling-out direction 58 is also minimal.

Figure 3:
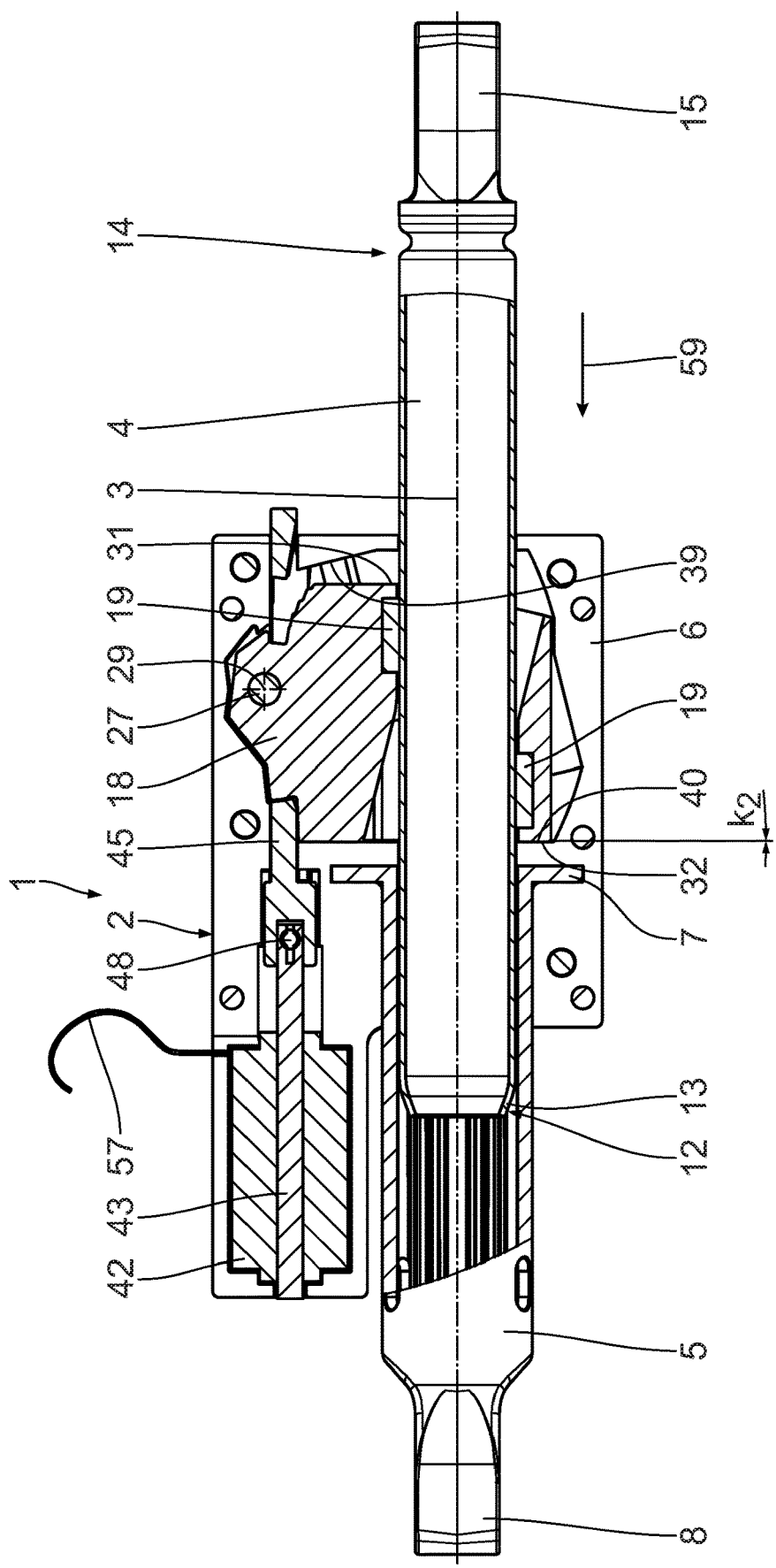
FIG. 3 shows an illustration corresponding to FIG. 2 with an unlocked friction lining carrier in the event of an actuation of the tappet in the pushing-in direction.

When the frictional damper 1 is actuated in the pushing-in direction 59, as illustrated in FIG. 3, and when the friction lining carrier 18 is released, the friction lining carrier 18 is pivoted in the clockwise direction about the tilting axis 29 according to FIG. 3 to an extent such that the friction lining carrier 18 lies with the second stop surface 32 against the corresponding second mating surface 40 of the housing 2. In this arrangement, which is also referred to as the pushed-in position, the frictional effect counter to the pushing-in direction 59 is at maximum since the friction linings 19 lie with maximal contact surface and maximum surface pressure against the outer side of the tappet 4. The pushed-in friction is greater than the pulled-out friction.

In the pushed-in position shown in FIG. 3, the friction lining carrier 18 is tilted by a second tilting angle $k_2$ in relation to the tilting axis 29. According to the exemplary embodiment which is shown, the second tilting angle $k_2$ is 0°.

In particular, the difference of first tilting angle $k_1$ and second tilting angle $k_2$ arises from the angle of inclination n which is set by the section longitudinal axes 23, 25.

The functionality, shown in FIGS. 2 and 3, of the frictional damper 1 with released friction lining carrier 18 substantially corresponds to that of the frictional damper according to EP 3 296 587 A1, to which reference is hereby expressly made. In addition, the frictional damper 1 has a further function.

The function of the switching unit 41 and the interaction with the frictional unit 17, in particular with the friction lining carrier 18, will be explained in more detail below with reference to FIGS. 4 to 8.

Figure 4:
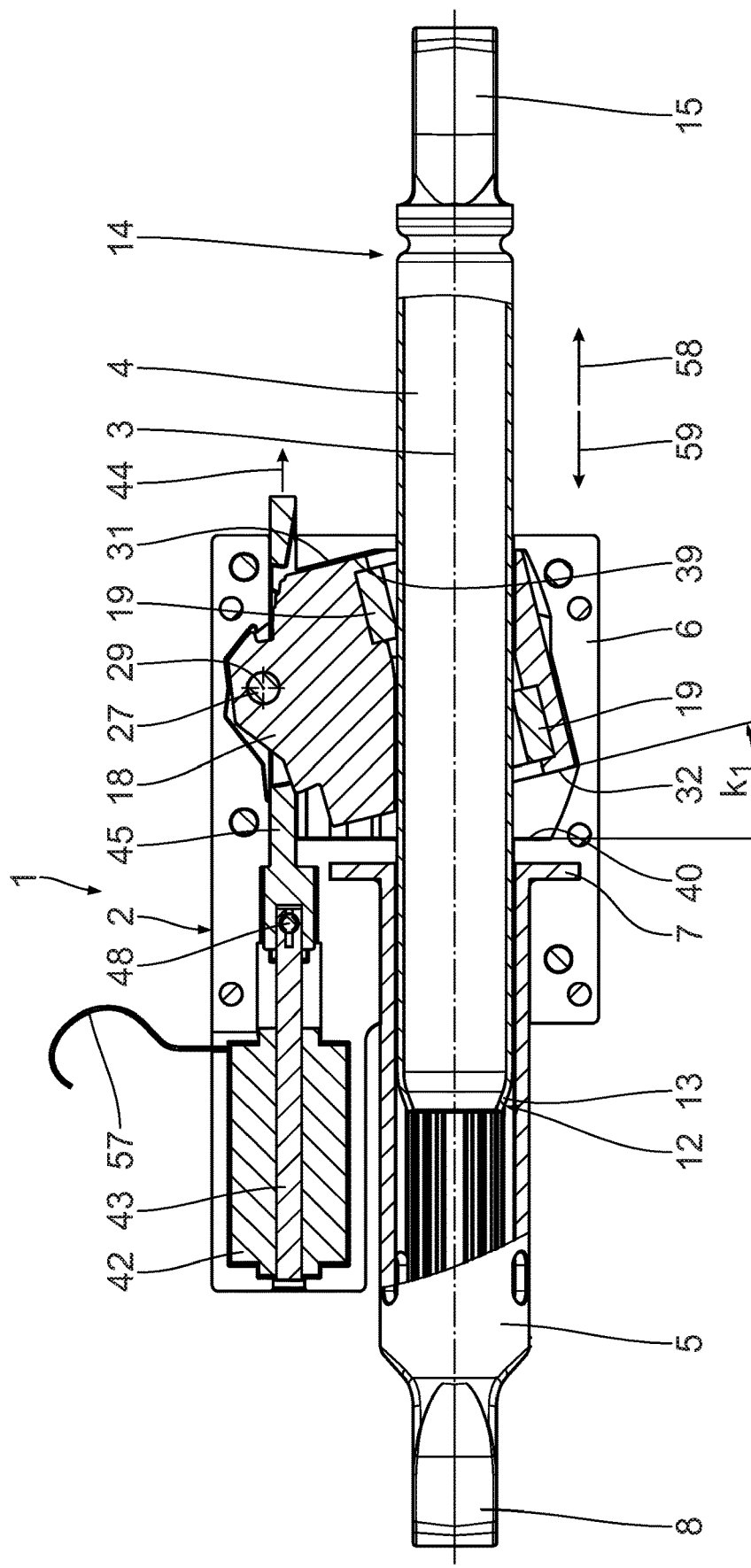
FIG. 4 shows an illustration corresponding to FIG. 2 with a locked friction lining carrier in a minimal position in the event of a minimal direction-independent frictional force.

Starting from FIG. 2, in which a minimal frictional force is exerted on the tappet 4 by the frictional unit 17, the locking element 45 is moved into a first locking position which is illustrated in FIG. 4. For this purpose, the locking element 45 is moved to the right, i.e. away from the actuator 42, along the actuating direction 44 from the arrangement in FIG. 2. The movement is undertaken until the locking element 45 lies with the first contact surface 54 against the first locking surface 33 of the friction lining carrier 18. In this switching position, the frictional damper 1 has a minimal frictional force, namely the pushed-in friction, and a minimal surface pressure, even when the tappet 4 is moved in the pushing-in direction 59. The friction lining carrier is in the minimal position. Tilting of the friction lining carrier 18 about the tilting axis 29 in the clockwise direction is blocked by the locking element 45. When the tappet 4 is shifted in the pulling-out direction 58, tilting of the friction lining carrier 18 in the counter clockwise direction about the tilting axis 29 is blocked by the friction lining carrier 18 lying with the first stop surface 31 against the corresponding mating surface 39.

Accordingly, it is possible, starting from the arrangement of the friction lining carrier 18 in the pushed-in position, i.e. with maximal frictional force, to block the friction lining carrier 18 by the locking element 45 being moved to the left, i.e. toward the actuator 42, along the actuating direction 44. In this arrangement, the friction lining carrier 18 lies with the second locking surface 34 against the second contact surface 55.

In order to block the friction lining carrier 18 in the pushed-in position, i.e. with maximal frictional force, a stroke movement of the locking element 45 along the actuating direction 45 is required. It has been recognised that it is advantageous if additional intermediate switching positions can be set which ensure different frictional conditions. In the various intermediate switching positions, the frictional damper in each case has a frictional force differing in magnitude. In particular, in the intermediate switching positions, a pivoting movement of the friction lining carrier 18 is in each case blocked by the locking element 45 when the tappet 4 is actuated in the pulling-out direction 58. In the pulling-out direction 58, the frictional force is set in terms of magnitude. When the tappet 4 is actuated in the pushing-in direction 59, a pivoting movement of the friction lining carrier 18 is possible, in particular in such a manner that the frictional force is increased when the tappet 4 is actuated in the pushing-in direction 59.

Figure 5:
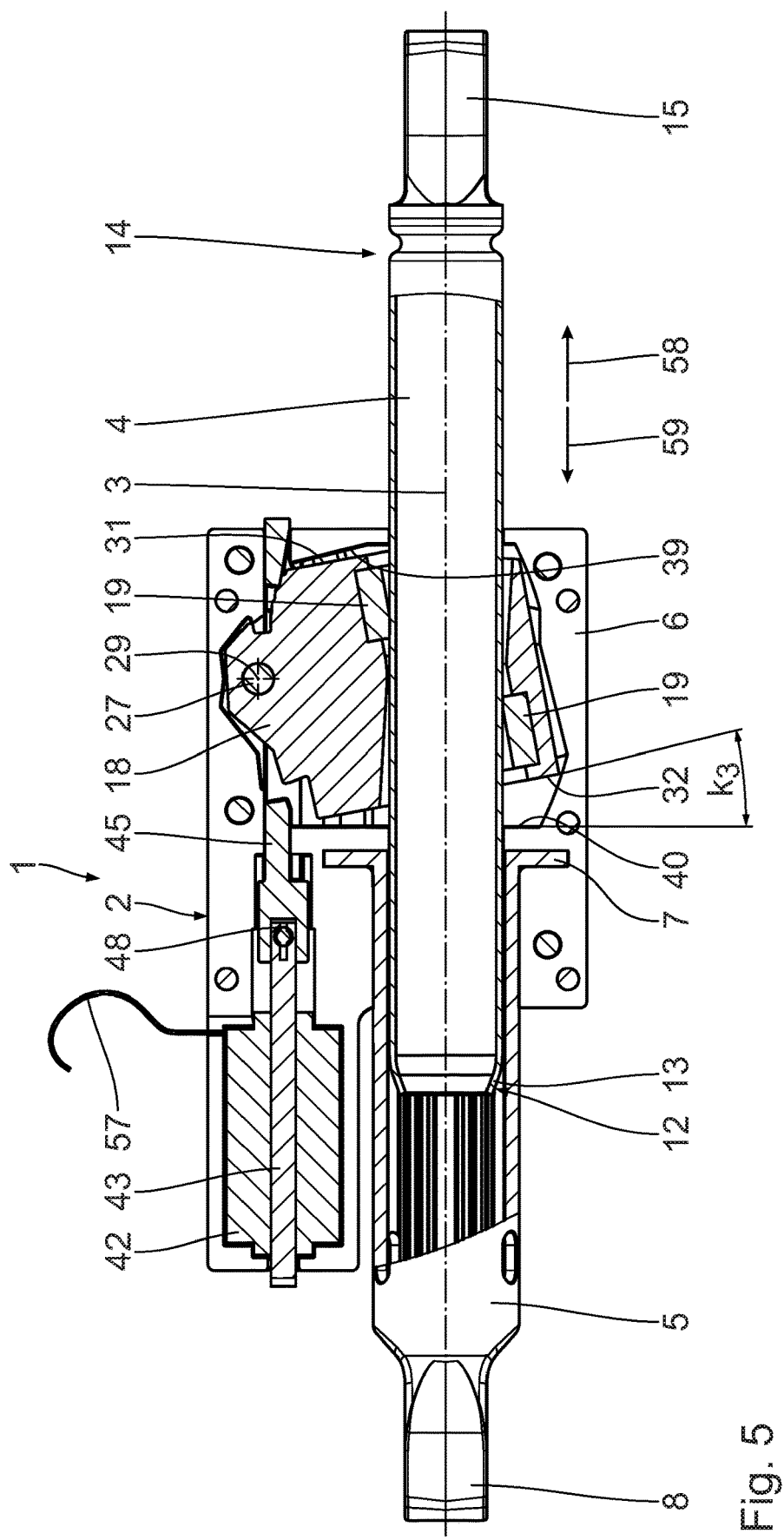
FIGS. 5 to 7 show illustrations corresponding to FIG. 2 with the friction lining carrier in various intermediate positions with a force locked differently in each case in the pulling-out direction, wherein the friction lining carrier is unlocked in the pushing-in direction.

According to the switching position, shown in FIG. 5, of a first latching step, the locking element 45 is arranged with the second contact surface 55 against the third locking surface 35. In this arrangement, the third tilting angle $k_3$ is 10.5°. According to FIG. 5, the friction lining carrier 18 is in a first intermediate position which constitutes a first intermediate switching position. In the first intermediate position, a pivoting movement of the friction lining carrier 18 in the counter clockwise direction about the tilting axis 29, i.e. when the tappet 4 is actuated in the pulling-out direction 58, is blocked by the locking element 45. When the tappet 4 is actuated in the pushing-in direction, the frictional force caused by the friction linings 19 brings about a torque on the friction lining carrier 19 in the clockwise direction about the tilting axis 29. Tilting of the friction lining carrier 18 in the clockwise direction about the tilting axis 29 is possible.

Figure 6:
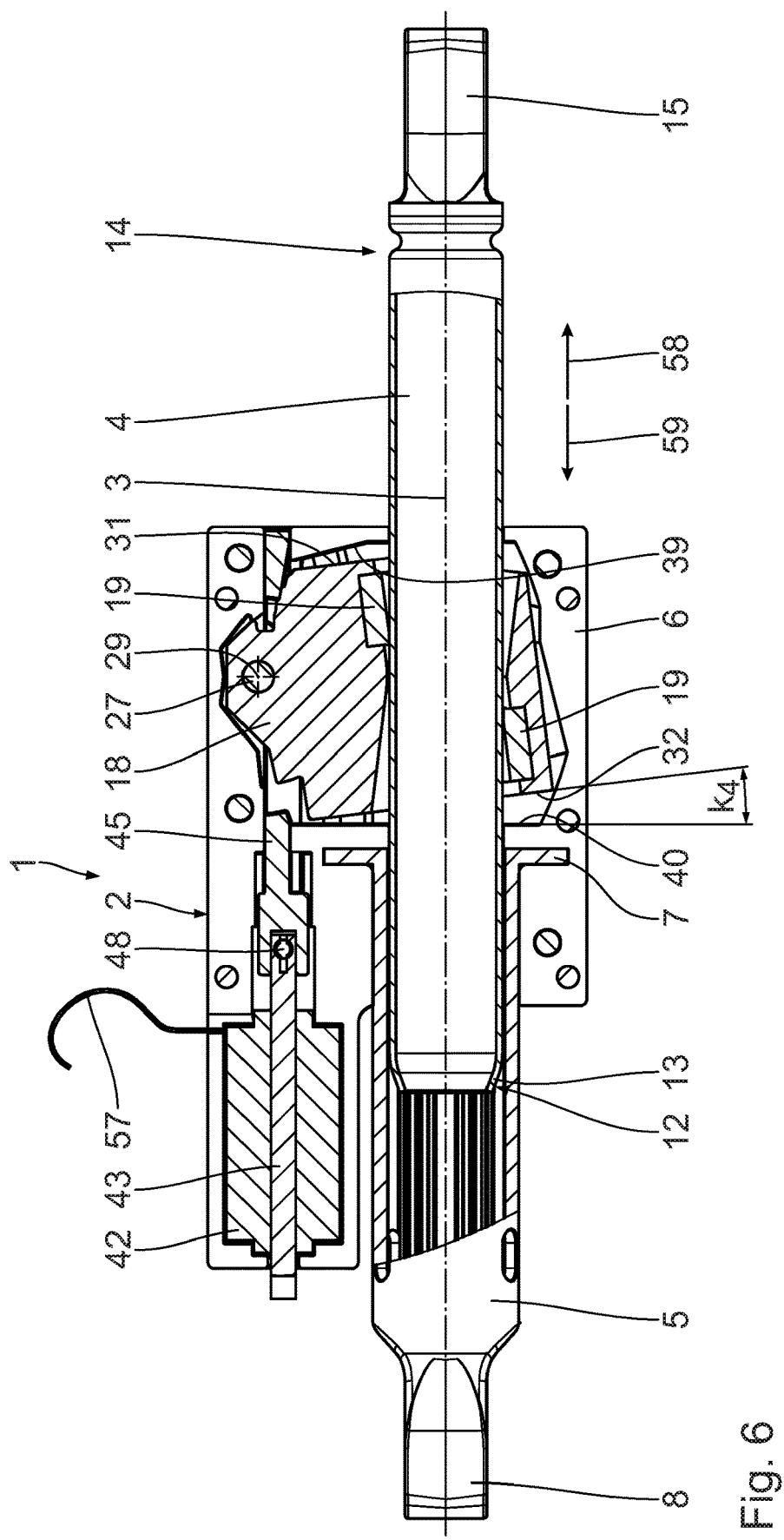
Figure 7:
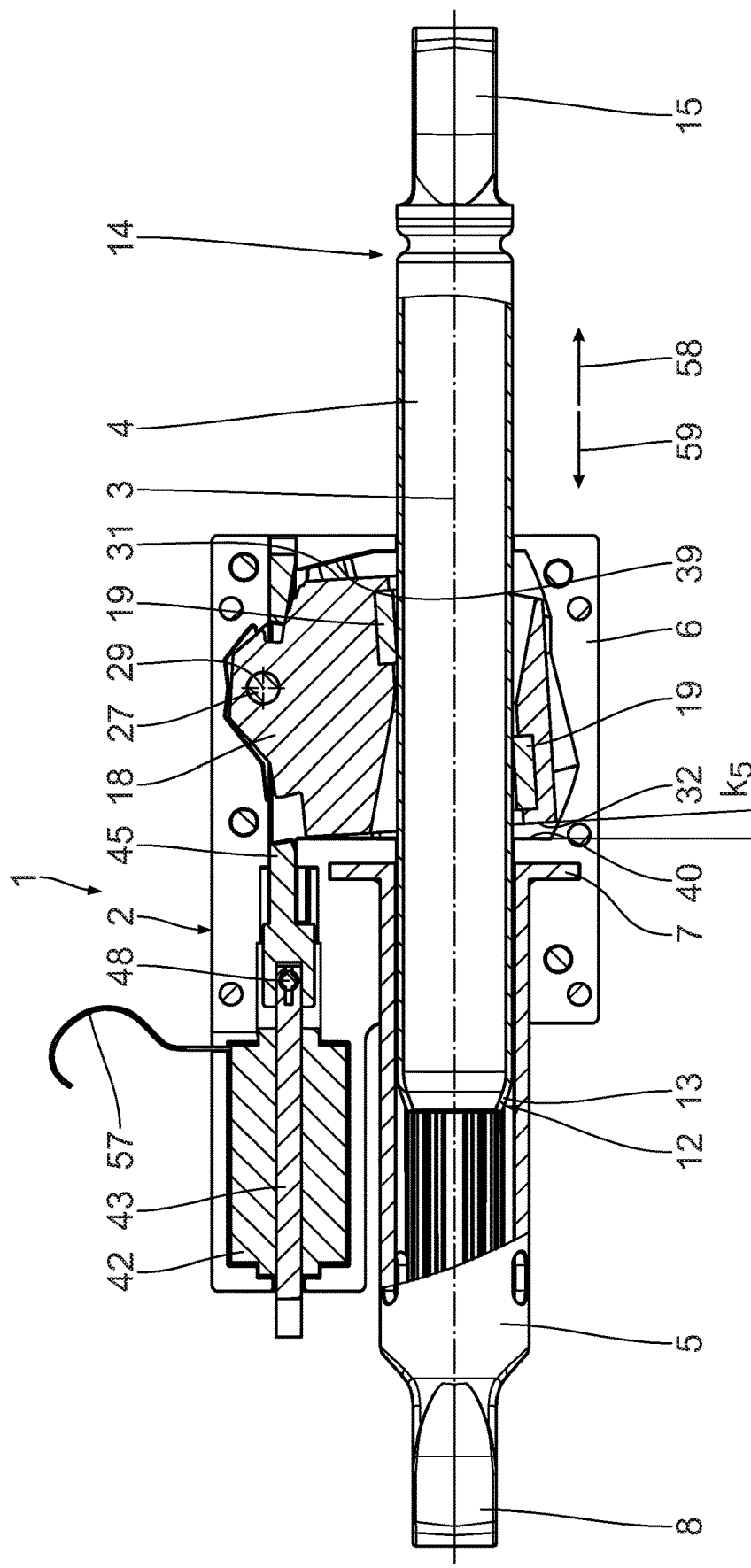

Accordingly, in the switching position according to FIG. 6, in the second latching step the locking element 45 is arranged with the second contact surface 55 against the fourth locking surface 36. In this arrangement, the fourth tilting angle $k_4$ is 7°. According to FIG. 6, the friction lining carrier 18 is in a second intermediate position which constitutes a second intermediate switching position. In the second intermediate position, a pivoting movement of the friction lining carrier 18 in the counter clockwise direction about the tilting axis 29, i.e. when the tappet 4 is actuated in the pulling-out direction 58, is blocked by the locking element 45. When the tappet 4 is actuated in the pushing-in direction 59, the frictional force caused by the friction linings 19 brings about a torque on the friction lining carrier 19 in the clockwise direction about the tilting axis 29. Tilting of the friction lining carrier 18 in the clockwise direction about the tilting axis 29 is possible. In the switching position according to FIG. 7, in a third latching step the locking element 45 is arranged with the second contact surface 55 against the fifth locking surface 37 of the friction lining carrier 18. In this arrangement, the fifth tilting angle $k_5$ is 3.5°. According to FIG. 7, the friction lining carrier 18 is in a third intermediate position which constitutes a third intermediate switching position. In the third intermediate position, a pivoting movement of the friction lining carrier 18 in the counter clockwise direction about the tilting axis 29, i.e. when the tappet 4 is actuated in the pulling-out direction 58, is blocked by the locking element 45. When the tappet 4 is actuated in the pushing-in direction 59, the frictional force caused by the friction linings 19 brings about a torque on the friction lining carrier 18 in the clockwise direction about the tilting axis 29. Tilting of the friction lining carrier 18 in the clockwise direction about the tilting axis 29 is possible.

Figure 8:
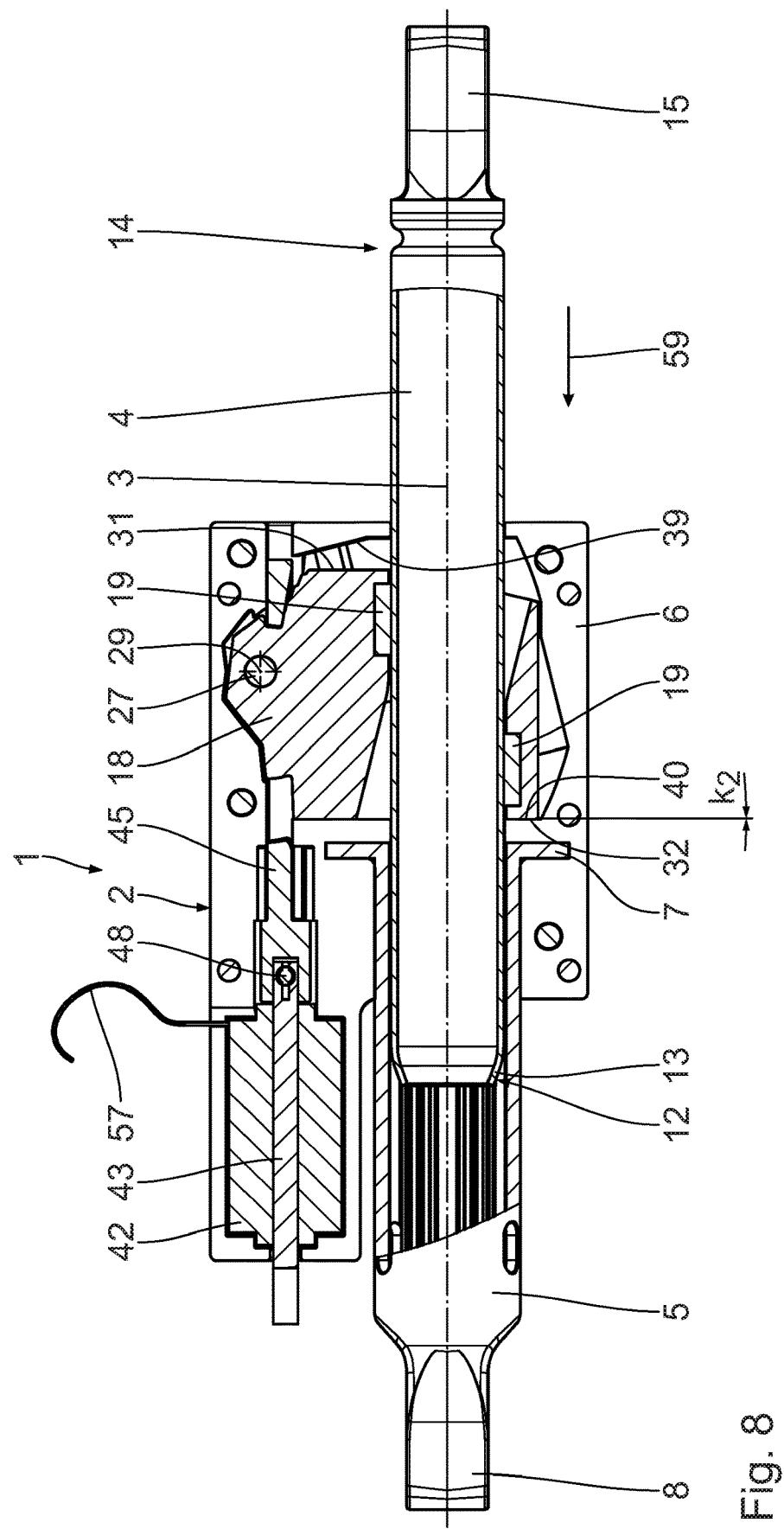
FIG. 8 shows an illustration corresponding to FIG. 2 with a locked friction lining carrier in a maximal position in the event of a maximal direction-independent frictional force.

In the arrangement according to FIG. 8, the frictional damper 1 has a maximal, direction-independent frictional force. The friction lining carrier 18 lies with the second stop surface 32 against the mating surface 40. Actuation of the tappet 4 in the pushing-in direction 59 does not bring about any tilting of the friction lining carrier 18 in the clockwise direction about the tilting axis 29. Tilting of the friction lining carrier 18 in the counter clockwise direction about the tilting axis 29, when the tappet is actuated in the pulling-out direction, is blocked by the locking element 45.

According to the exemplary embodiment which is shown, three intermediate steps are thus provided between the switching position in the pulled-out position with minimal frictional force in the pushing-in direction 59 according to FIG. 4 and in the pushed-in position with maximal frictional force in the pushing-in direction 59 according to FIG. 8, in which three intermediate steps the tilting angles $k_3$, $k_4$ and $k_5$ are arranged in each case identically spaced apart from one another and in particular from the first tilting angle $k_1$ and the second tilting angle $k_2$.

It is possible to provide more or fewer, in particular no, intermediate steps. It is in particular conceivable for the distances between the individual intermediate steps and/or the switching steps of maximal and minimal frictional force to be set differently.

It has been found that the switching positions with the intermediate steps according to the first to third latching step make it easier for the frictional damper 1, even in the event of smaller amplitudes of the tappet 4, to carry out the switching operation of the locking element 45 into the position of maximal frictional force.

A second exemplary embodiment of the invention will be described below with reference to FIGS. 14 to 18. Structurally identical parts are given the same reference signs as in the first exemplary embodiment, to the description of which reference is hereby made. Structurally different, but functionally identical parts are given the same reference signs followed by an a.

One substantial difference of the frictional damper 1a in comparison with the previous exemplary embodiment consists in that the actuator 42a is configured to be single-acting. The actuator 42a can be actuated along the actuating direction 44 in a direction which is directed from the actuator 42a toward the locking element 45a. This direction is oriented from the left to the right according to FIGS. 15 to 18. In the opposite counter direction, the actuator 42a cannot be switched.

In addition, the frictional damper 1a has a failsafe unit which, according to the exemplary embodiment which is shown, has two force storage elements 60. According to the exemplary embodiment which is shown, each force storage element 60 is configured as a helical compression spring. It is also possible for more or fewer than two force storage elements 60 to be provided. The force storage elements 60 are arranged in the housing 2a laterally in each case next to the locking element 45 and are supported in the housing 2a axially along the actuating direction 44 in each case on a contact shoulder 61 fixed on the housing. The contact shoulder 61 is oriented in the housing 2a in such a manner that a movement of the force storage elements 60 in the actuating direction of the actuator 42a, i.e. directed from the actuator 42a toward the locking element 45a, is prevented.

The locking element 45a has laterally protruding, integrally moulded-on pressure plates 62. The pressure plates 62 serve for lying directly against the respective force storage element 60. Each force storage element 60 is arranged along the actuating direction 44, i.e. between a pressure plate 62 of the locking element 45a and the contact shoulder 61 of the housing 2a.

A receiving element 63 is arranged in each case on the pressure plates 62 and the oppositely arranged contact shoulders 61. The receiving element 63 serves for receiving, guiding and holding the force storage element 60. The receiving elements 63 are of substantially identical configuration. The receiving elements 63 are of substantially cylindrical or slightly conical configuration. The receiving elements 63 are configured in such a manner that they can be arranged within the hollow cylinder formed by the force storage element 60. The outer diameter of the respective receiving element 63 is smaller and in particular slightly smaller than the inner diameter of the force storage element 60. The outer diameter of the receiving element 63 can also substantially correspond to the inner diameter of the force storage element 60.

The receiving element 63 extends in the axial direction of the longitudinal axis 3.

The function of the frictional damper 1a will be explained in more detail below with reference to FIGS. 14 to 18.

Figure 15:
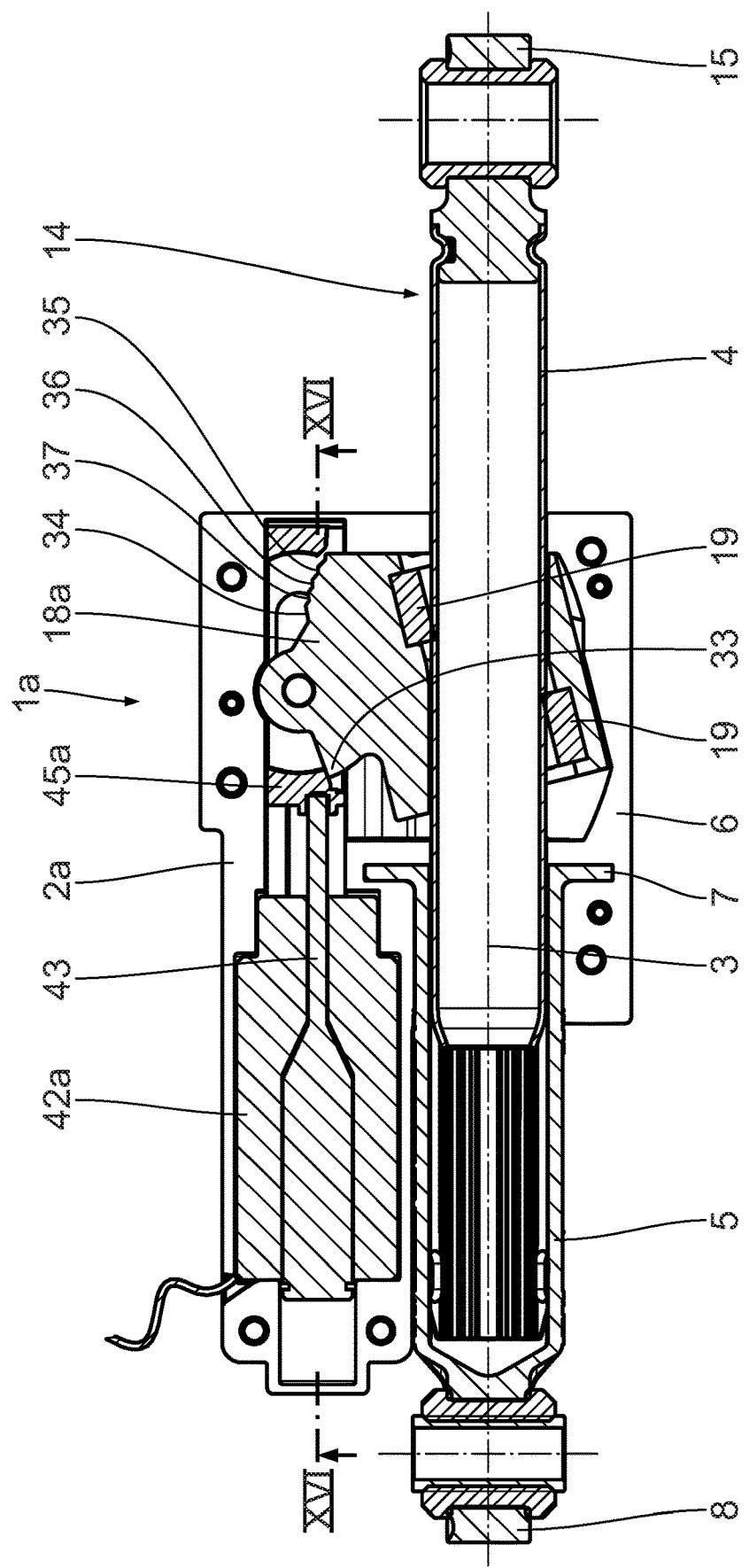
FIG. 15 shows an illustration corresponding to FIG. 4 of the frictional damper according to FIG. 14.
Figure 16:
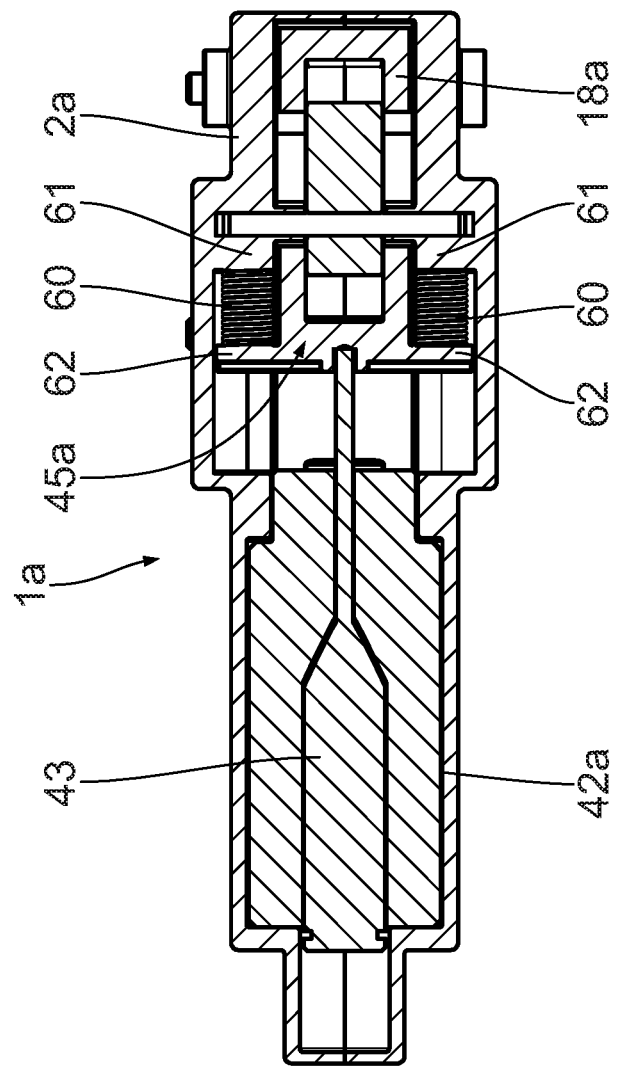
FIG. 16 shows a longitudinal section according to sectional line XVI-XVI in FIG. 15.

In order to transfer the frictional damper 1a into the arrangement shown in FIGS. 15 and 16, the actuator 42 is switched, i.e. energised. In order to trigger said switching operation, the actuator 42, which is configured as a solenoid, is overridden, in particular is activated with four times the nominal voltage. As a result, the actuating element 43 according to FIGS. 15 and 16 is moved from the left to the right into the position shown in FIGS. 17 and 18. With the actuating element 43, the locking element 45a which is fastened thereto is instantaneously moved. The locking element 45a lies against the first locking surface 33 of the friction lining carrier 18a and locks the friction lining carrier 18a in a minimal position. In the minimal position of the friction lining carrier 18a, the friction linings 19 are arranged with minimal contact with the tappet 4 of the frictional damper 1a. The minimal position is illustrated in FIGS. 15 and 16.

After the switching process has taken place, the voltage can be reduced to the nominal voltage. The force provided by the solenoid 42a is sufficient to hold the locking element 45a in the minimal position. This holding force is required since the movement of the locking element 45a into the minimal position has caused the force storage elements 60 to be compressed and therefore a mechanical force is impressed on the force storage elements 60. Said counterforce acts counter to the holding force of the actuator 42a.

Figure 17:
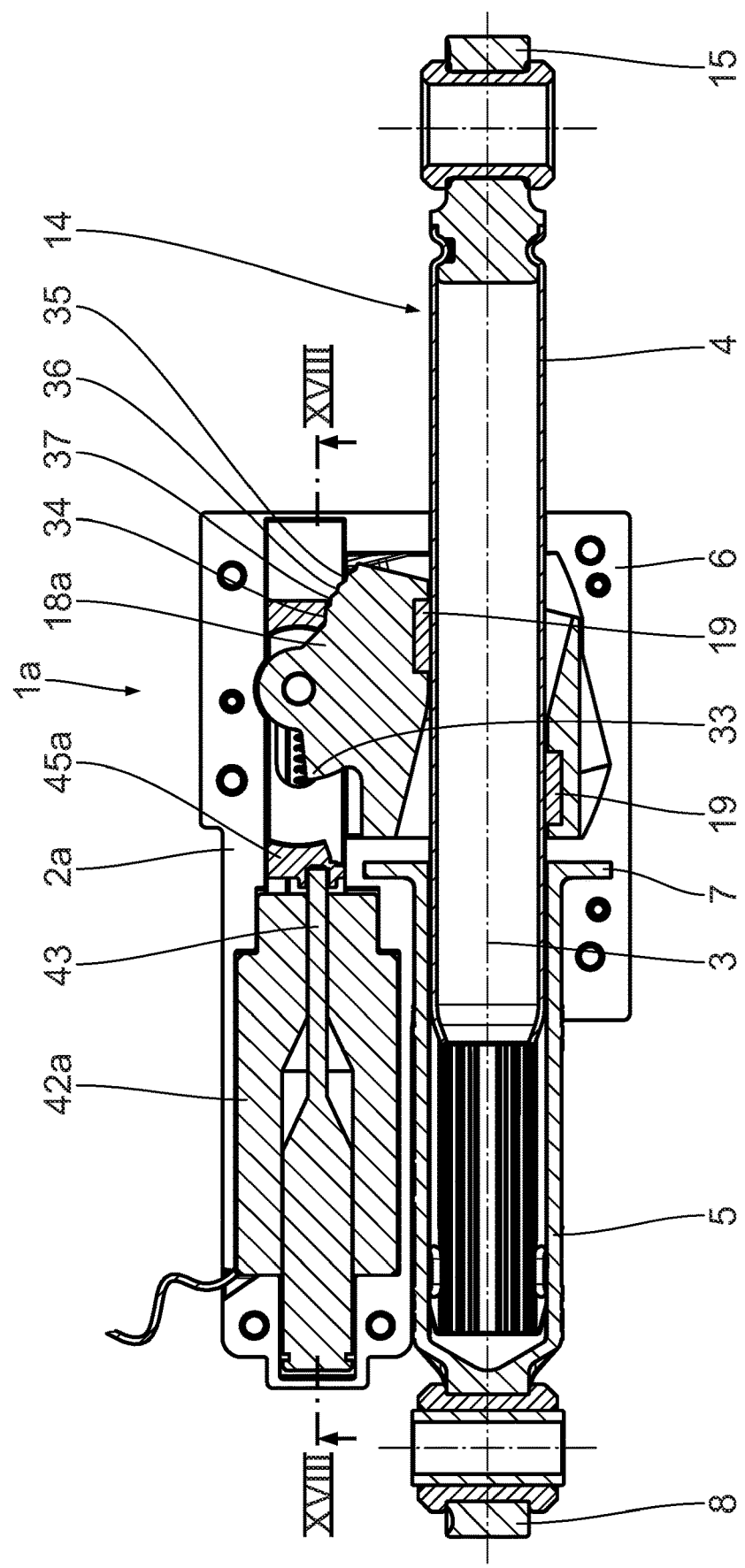
FIG. 17 shows an illustration corresponding to FIG. 16 in a maximal position of the friction lining carrier.
Figure 18:
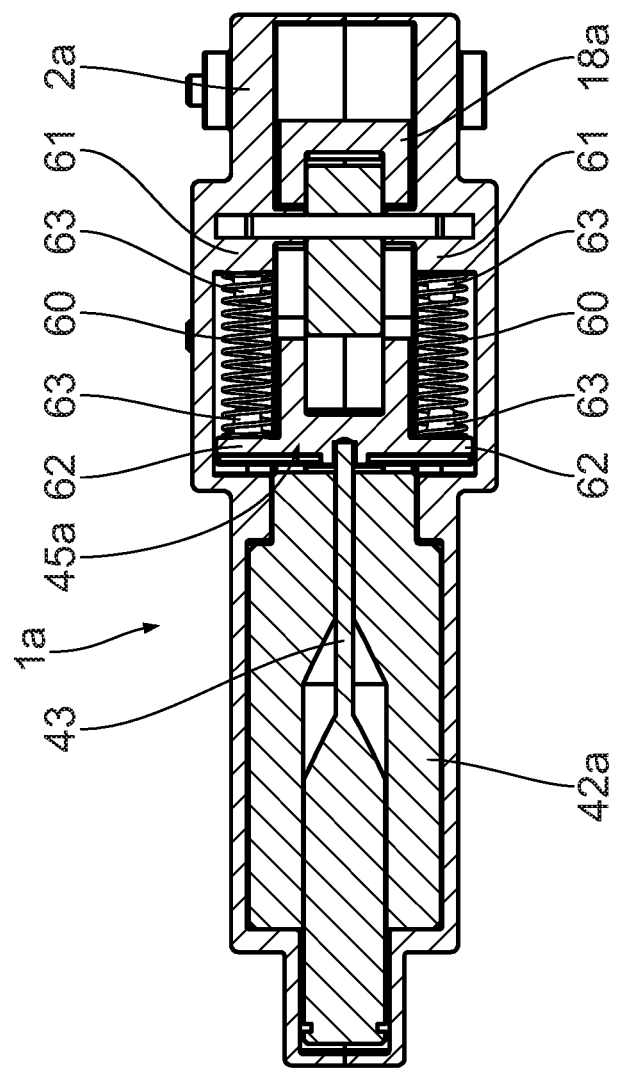
FIG. 18 shows a sectional illustration according to sectional line XVIII-XVIII in FIG. 17.

In order to move the actuator 42a back into the maximal position according to FIGS. 17 and 18, the energisation of the actuator 42a is switched off. As a result of the impressed counterforce of the force storage elements 60, the locking element 45a is moved in the direction of the actuator 42a, i.e. from the right to the left according to FIGS. 15 and 16. A reason for this is the compression force of the force storage elements 60 on the pressure plates 62.

Owing to the fact that said movement back from the maximal position according to FIGS. 17 and 18 into the minimal position according to FIGS. 15 and 16 takes place whenever the actuator 42 is not energised, the force storage elements 60 form the failsafe unit for the frictional damper 1a. It is ensured that, in the event of an unintentional current failure, the frictional damper 1a is reliably transferred into a state in which maximal frictional damping is ensured.

The actuator 42a according to the exemplary embodiment which is shown does not have any self-holding. This means that the actuator 42a can move the actuating element 43 with the locking element 45a along the actuating direction 44 substantially without any friction.

It is alternatively conceivable to configure the actuator 42a as a solenoid with partial self-holding. One advantage consists in that the necessary voltage for holding the actuator 42a in the minimal position shown in FIG. 15 is reduced in comparison to the actuator 42a without self-holding. The energy consumption is thereby reduced. In particular, the force storage elements 60 are dimensioned in such a manner that the impressed counterforce of the force storage elements 60 is greater than the self-holding of the magnet. In the event of a current failure or if the energisation of the actuator 42 is switched off, the locking element 45a is reliably moved back into the maximal position.

It is alternatively also possible to configure the actuator 42a with full self-holding. In this case, the holding force of the actuator 42a in the minimal position according to FIG. 15 is of such a magnitude that, after the switching operation with overriding, the voltage supply can be switched off. As a result, the energy saving is additionally reduced. In order to move the actuator 42a back into the maximal position, an energisation of the actuator 42a in the counter direction is required. Since the self-holding rapidly decreases, a brief energisation in the form of a short current pulse is sufficient to release the self-holding, with the force storage elements 60 then moving the locking element 45a completely back into the maximal position. In order to ensure that the locking element 45a is moved back into the maximal position even in the event of a current failure, i.e. to permit what is referred to as a failsafe function, the switching unit 41 is in signal connection with an electrical storage element that is not illustrated. The electrical storage element is operatively connected to the actuator 42a. The electrical storage element is formed in particular by one or more capacitors which provide the electrical supply for a short current pulse for releasing the self-holding in the event of a current failure.

What is claimed is:

1. A frictional damper comprising:
   a. a housing having a longitudinal axis,
   b. a tappet which is movable along the longitudinal axis,
   c. a frictional unit for generating a direction-dependent frictional force on the tappet, wherein the frictional unit comprises at least one friction lining lying rubbingly against the tappet,
   d. a switching unit for variably setting a magnitude of the frictional force; wherein the switching unit has a switchable actuator and a locking element which is coupled mechanically to the actuator;
   e. a failsafe unit for a failsafe function of the frictional damper for arranging the locking element in a locked arrangement on the friction lining carrier in such a manner that a maximal direction-independent frictional force is in effect.

2. The frictional damper according to claim 1, wherein the frictional unit comprises a friction lining carrier on which the at least one friction lining is held, wherein the friction lining carrier is arranged such that it is movable relative to the tappet between a pulled-out position and a pushed-in position.

3. The frictional damper according to claim 1, wherein the friction lining is arranged in the housing such that it is tiltable about a tilting axis, wherein the tilting axis is arranged transversely with respect to the longitudinal axis.

4. The frictional damper according to claim 1, wherein the friction lining carrier has at least one friction lining receptacle in which the at least one friction lining is arranged.

5. The frictional damper according to claim 1, comprising two friction linings which each have a half-shell contour.

6. The frictional damper according to claim 1, wherein the friction lining carrier has a through opening, through which the tappet is guided.

7. The frictional damper according to claim 6, wherein the through opening has a contour which is asymmetrical at least in sections perpendicularly with respect to the longitudinal axis.

8. The frictional damper according to claim 6, wherein the through opening has a first through opening section and a second through opening section, wherein the first through opening section and the second through opening section each have a section longitudinal axis, said section longitudinal axes being arranged inclined by an angle of inclination with respect to one another.

9. The frictional damper according to claim 6, wherein the friction lining receptacle is configured as a depression in the through opening.

10. The frictional damper according to claim 1, wherein the frictional damper has a first fastening element, which is arranged on the housing, and a second fastening element, which is arranged on the tappet, for the fastening to parts which are movable with respect to one another.

11. The frictional damper according to claim 1, wherein the locking element has at least one contact surface with which the locking element lies against at least one locking surface of the friction lining carrier in the locked arrangement.

12. The frictional damper according to claim 1, wherein the locking element is in the form of a sliding element which is movable linearly.

13. A frictional damper comprising:
   a. a housing having a longitudinal axis,
   b. a tappet which is movable along the longitudinal axis,
   c. a frictional unit for generating a direction-dependent frictional force on the tappet, wherein the frictional unit comprises at least one friction lining lying rubbingly against the tappet,
   d. a switching unit for variably setting a magnitude of the frictional force; wherein the switching unit has a switchable actuator and a locking element which is coupled mechanically to the actuator; the locking element is in the form of a sliding element which is moveable perpendicularly with respect to the tilting axis.

14. A frictional damper comprising:
   a. a housing having a longitudinal axis,
   b. a tappet which is movable along the longitudinal axis,
   c. a frictional unit for generating a direction-dependent frictional force on the tappet, wherein the frictional unit comprises at least one friction lining lying rubbingly against the tappet,
   d. a switching unit for variably setting a magnitude of the frictional force; wherein the switching unit has a switchable actuator and a locking element which is coupled mechanically to the actuator; wherein the locking element has a recess for collision-free moving of the locking element along the longitudinal axis.

15. A frictional damper comprising
   a. a housing having a longitudinal axis,
   b. a tappet which is movable along the longitudinal axis,
   c. a frictional unit for generating a direction-dependent frictional force on the tappet, wherein the frictional unit comprises at least one friction lining lying rubbingly against the tappet,
   d. a switching unit for variably setting the frictional force, wherein the switching unit has a switchable actuator and a locking element which is coupled mechanically to the actuator, wherein the locking element is in the form of a sliding element which is movable linearly.

16. The frictional damper according to claim 15, wherein the frictional unit comprises a friction lining carrier on which the at least one friction lining is held, wherein the friction lining carrier is arranged such that it is movable relative to the tappet between a pulled-out position and a pushed-in position.

17. The frictional damper according to claim 15, wherein the friction lining is arranged in the housing such that it is tiltable about a tilting axis, wherein the tilting axis is arranged transversely with respect to the longitudinal axis.

18. The frictional damper according to claim 15, wherein the friction lining carrier has at least one friction lining receptacle in which the at least one friction lining is arranged.

19. The frictional damper according to claim 15, comprising two friction linings which each have a half-shell contour.

20. The frictional damper according to claim 15, wherein the friction lining carrier has a through opening, through which the tappet is guided.

21. The frictional damper according to claim 20, wherein the through opening has a contour which is asymmetrical at least in sections perpendicularly with respect to the longitudinal axis.

22. The frictional damper according to claim 20, wherein the through opening has a first through opening section and a second through opening section, wherein the first through opening section and the second through opening section each have a section longitudinal axis, said section longitudinal axes being arranged inclined by an angle of inclination with respect to one another.

23. The frictional damper according to claim 20, wherein the friction lining receptacle is configured as a depression in the through opening.

24. The frictional damper according to claim 15, wherein the frictional damper has a first fastening element, which is arranged on the housing, and a second fastening element, which is arranged on the tappet, for the fastening to parts which are movable with respect to one another.

25. The frictional damper according to claim 15, wherein the locking element has at least one contact surface with which the locking element lies against at least one locking surface of the friction lining carrier in the locked arrangement.

* * * * *